(12) United States Patent
Mori

(10) Patent No.: US 9,864,166 B2
(45) Date of Patent: *Jan. 9, 2018

(54) IMAGING LENS AND IMAGING APPARATUS

(71) Applicant: FUJIFILM Corporation, Tokyo (JP)

(72) Inventor: Masao Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/222,193

(22) Filed: Jul. 28, 2016

(65) Prior Publication Data

US 2017/0059816 A1  Mar. 2, 2017

(30) Foreign Application Priority Data

Aug. 24, 2015 (JP) .................................. 2015-164688

(51) Int. Cl.
  *G02B 9/62* (2006.01)
  *G02B 13/00* (2006.01)
  *G02B 13/06* (2006.01)

(52) U.S. Cl.
  CPC ........... *G02B 9/62* (2013.01); *G02B 13/0045* (2013.01); *G02B 13/06* (2013.01)

(58) Field of Classification Search
  CPC ............................. G02B 9/62; G02B 13/0045
  USPC .................. 359/713, 752, 756, 762
  See application file for complete search history.

(56) References Cited

U.S. PATENT DOCUMENTS

| 7,301,578 | B2* | 11/2007 | Ohzawa | G02B 13/06 348/340 |
| 7,633,688 | B2* | 12/2009 | Kamo | G02B 13/0095 359/717 |
| 7,782,551 | B2* | 8/2010 | Hsu | G02B 13/06 359/749 |
| 2011/0037828 | A1* | 2/2011 | Wakamiya | G02B 9/62 348/36 |
| 2015/0268446 | A1 | 9/2015 | Chen et al. | |

FOREIGN PATENT DOCUMENTS

TW   2014-028336 A   7/2014

* cited by examiner

*Primary Examiner* — Darryl J Collins
(74) *Attorney, Agent, or Firm* — Studebaker & Brackett PC

(57) ABSTRACT

An imaging lens is constituted by, in order from the object side to the image side: a first lens having a negative refractive power and a concave surface toward the image side; a second lens having a negative refractive power; a third lens having a positive refractive power and a convex surface toward the image side; a fourth lens having a negative refractive power and a concave surface toward the image side; a biconvex fifth lens which is cemented to the fourth lens; and a sixth lens having a negative refractive power and a concave surface toward the object side. Conditional Formula (1) below is satisfied:

$-2.1 < r3r/f < -1.2$  (1).

20 Claims, 14 Drawing Sheets

EXAMPLE 1

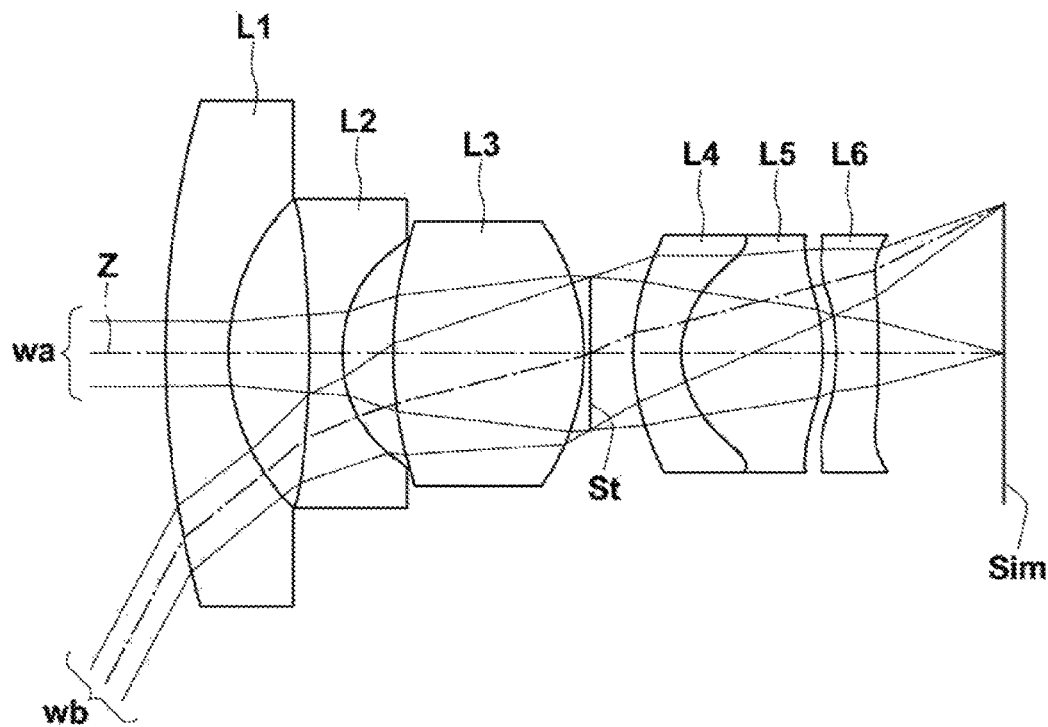
FIG.1 EXAMPLE 1
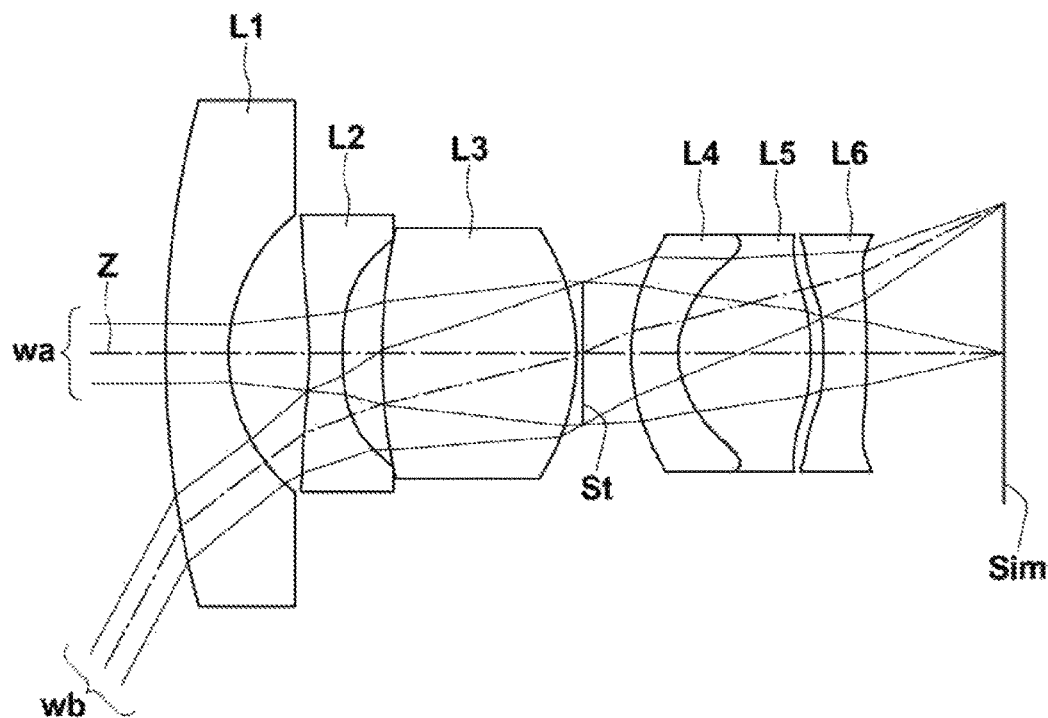
FIG.2 EXAMPLE 2

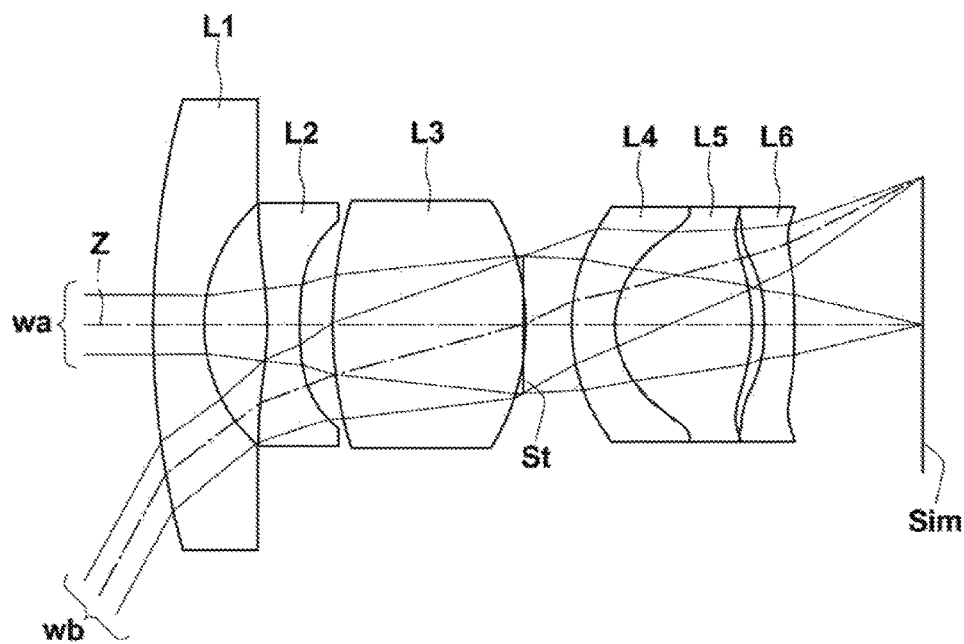
FIG.3 EXAMPLE 3
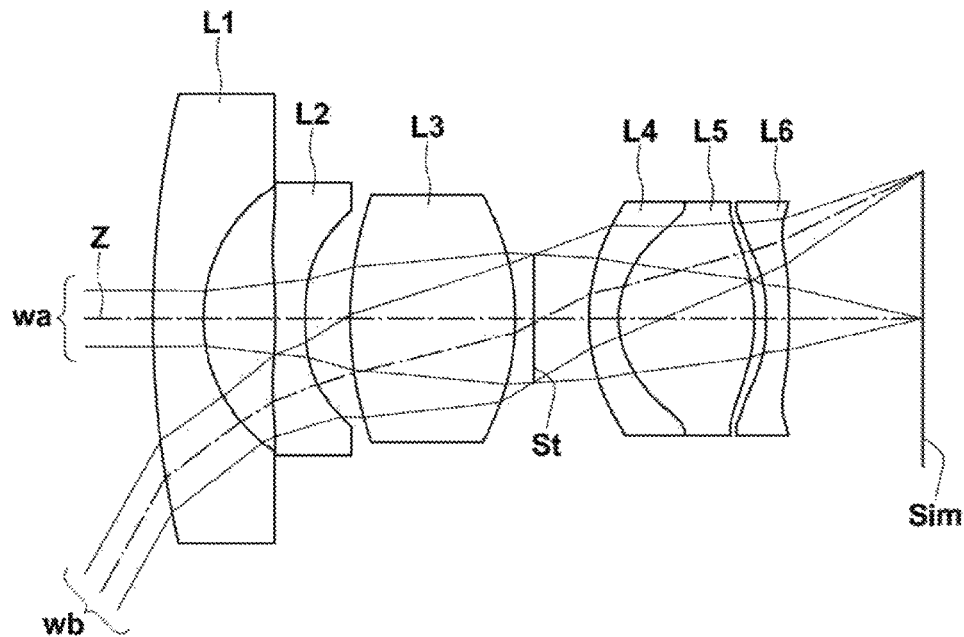
FIG.4 EXAMPLE 4

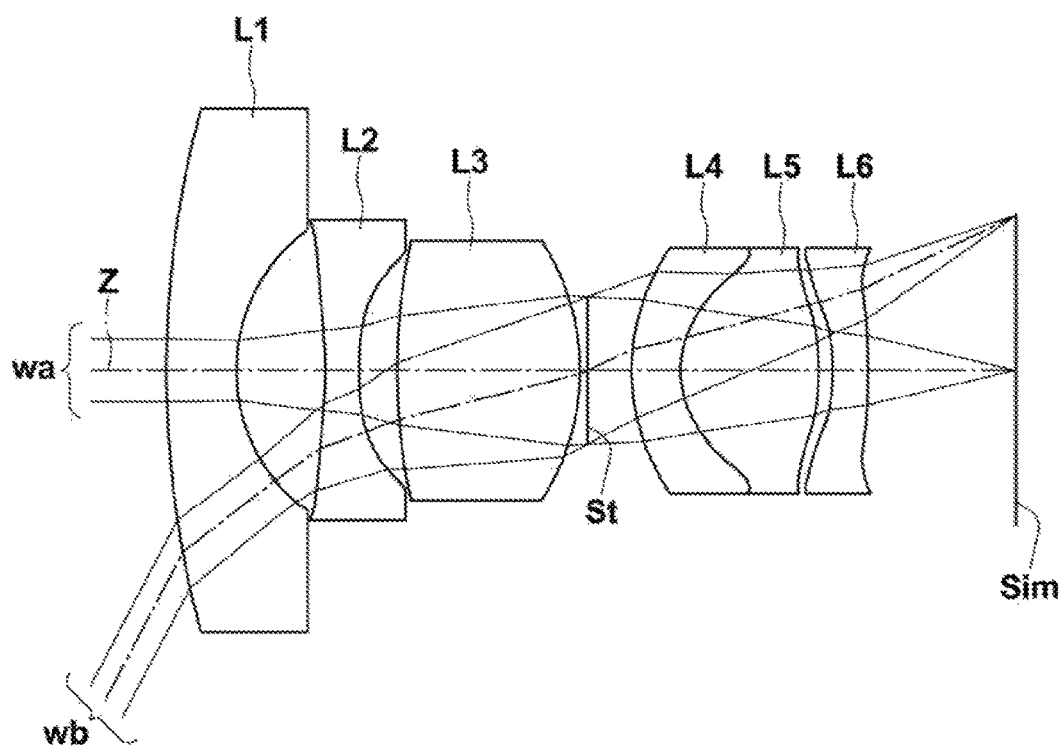
EXAMPLE 5 FIG.5

FIG.8 EXAMPLE 3

FIG.9 EXAMPLE 4

FIG.10 EXAMPLE 5

IMAGING LENS AND IMAGING APPARATUS

CROSS REFERENCE TO RELATED APPLICATIONS

The present application claims priority under 35 U.S.C. §119 to Japanese Patent Application No. 2015-164688 filed on Aug. 24, 2015. The above application is hereby expressly incorporated by reference in its entirety, into the present application.

BACKGROUND

The present disclosure is related to an imaging lens which can be favorably utilized in a vehicle mounted camera, an imaging camera, etc., and to an imaging apparatus equipped with this imaging lens.

Recently, cameras have been being mounted in automobiles to assist drivers in confirming blind spots toward the sides and the rear, and to discriminate automobiles, pedestrians, obstacles, etc. within images in the vicinity of vehicles. A known imaging lens which is utilizable in such vehicle mounted cameras is disclosed in Taiwanese Patent Publication No. 201428336, for example. Taiwanese Patent Publication No. 201428336 discloses a lens system having a six lens configuration.

SUMMARY

High optical performance is required in vehicle mounted cameras in order to improve the visibility of imaged regions and to improve the accuracy in discrimination of obstacles and the like. However, correction of aberrations is insufficient in the lens system disclosed in Taiwanese Patent Publication No. 201428336, and accordingly, there is demand for an imaging lens in which various aberrations are favorably corrected.

The present disclosure has been developed in view of the foregoing circumstances. The present disclosure provides an imaging lens, in which aberrations are favorably corrected, as well as an imaging apparatus equipped with this imaging lens.

The imaging lens of the present disclosure consists of, in order from the object side to the image side:

a first lens having a negative refractive power and a concave surface toward the image side;

a second lens having a negative refractive power;

a third lens having a positive refractive power and a convex surface toward the image side;

a fourth lens having a negative refractive power and a concave surface toward the image side;

a biconvex fifth lens which is cemented to the fourth lens; and a sixth lens having a negative refractive power and a concave surface toward the object side; and Conditional Formula (1) below being satisfied:

$$-2.1 < r3r/f < -1.2 \qquad (1)$$

wherein r3r is the radius of curvature of the surface toward the image side of the third lens, and f is the focal length of the entire lens system.

Note that it is more preferable for Conditional Formula (1-1) below to be satisfied.

$$-2.0 < r3r/f < -1.45 \qquad (1\text{-}1)$$

In the imaging lens of the present disclosure, it is preferable for Conditional Formula (2) below to be satisfied. Note that it is more preferable for Conditional Formula (2-1) below to be satisfied.

$$-1.05 < f12/f < -0.8 \qquad (2)$$

$$-1.0 < f12/f < -0.85 \qquad (2\text{-}1)$$

wherein f12 is the combined focal length of the first lens and the second lens, and f is the focal length of the entire lens system.

In addition, it is preferable for Conditional Formula (3) below to be satisfied. Note that it is more preferable for Conditional Formula (3-1) below to be satisfied.

$$0.7 < f1/f2 < 2.0 \qquad (3)$$

$$0.8 < f1/f2 < 1.2 \qquad (3\text{-}1)$$

wherein f1 is the focal length of the first lens, and f2 is the focal length of the second lens.

In addition, it is preferable for the second lens to be of a biconcave shape.

In addition, it is preferable for Conditional Formula (4) below to be satisfied. Note that it is more preferable for Conditional Formula (4-1) below to be satisfied.

$$-2.8 < f2/f < -1.3 \qquad (4)$$

$$-2.5 < f2/f < -1.5 \qquad (4\text{-}1)$$

wherein f2 is the focal length of the second lens, and f is the focal length of the entire lens system.

In addition, it is preferable for Conditional Formula (5) below to be satisfied. Note that it is more preferable for Conditional Formula (5-1) below to be satisfied.

$$2.5 < f123/f < 5.0 \qquad (5)$$

$$3.0 < f123/f < 4.5 \qquad (5\text{-}1)$$

wherein f123 is the combined focal length of the first lens, the second lens, and the third lens, and f is the focal length of the entire lens system.

In addition, it is preferable for Conditional Formula (6) below to be satisfied. Note that it is more preferable for Conditional Formula (6-1) below to be satisfied.

$$2.0 < r3f/f < 6.0 \qquad (6)$$

$$2.5 < r3f/f < 5.0 \qquad (6\text{-}1)$$

wherein r3f is the radius of curvature of the surface toward the object side of the third lens, and f is the focal length of the entire lens system.

In addition, it is preferable for Conditional Formula (7) below to be satisfied. Note that it is more preferable for Conditional Formula (7-1) below to be satisfied.

$$0.5 < r45/f < 0.75 \qquad (7)$$

$$0.55 < r45/f < 0.7 \qquad (7\text{-}1)$$

wherein r45 is the radius of surface of the coupling surface between the fourth lens and the fifth lens, and f is the focal length of the entire lens system.

In addition, it is preferable for Conditional Formula (8) below to be satisfied. Note that it is more preferable for Conditional Formula (8-1) below to be satisfied.

$$-5.5 < f6/f < -2.5 \qquad (8)$$

$$-5.0 < f6/f < -3.0 \qquad (8\text{-}1)$$

wherein f6 is the focal length of the sixth lens, and f is the focal length of the entire lens system.

In addition, it is preferable for Conditional Formula (9) below to be satisfied. Note that it is more preferable for Conditional Formula (9-1) below to be satisfied.

$$0.85 < \max.|f/fx| < 1.2 \qquad (9)$$

$$0.9 < \max.|f/fx| < 1.1 \qquad (9-1)$$

wherein f is the focal length of the entire lens system, and fx is the focal length of an xth lens (x is an integer within a range from 1 to 6). Note that "max. |f/fx|" means the maximum value from among the values of "|f/fx|" for the first lens through the sixth lens.

An imaging apparatus of the present disclosure is characterized by being equipped with the imaging lens of the present disclosure described above.

Note that the above expression "consists of" means that lenses that practically have no power, optical elements other than lenses such as a stop, a cover glass, and filters, and mechanical components such as lens flanges, a lens barrel, an imaging element, a camera shake correcting mechanism, etc. may be included, in addition to the constituent elements listed above.

In addition, the surface shapes, the radii of curvature, and the signs of the refractive powers of lenses in the above lens are those which are considered in the paraxial region for lenses that include aspherical surfaces.

The imaging lens of the present disclosure consists of, in order from the object side to the image side: the first lens having a negative refractive power and a concave surface toward the image side; the second lens having a negative refractive power; the third lens having a positive refractive power and a convex surface toward the image side; the fourth lens having a negative refractive power and a concave surface toward the image side; the biconvex fifth lens which is cemented to the fourth lens; and the sixth lens having a negative refractive power and a concave surface toward the object side; and Conditional Formula (1) below is satisfied. Therefore, it is possible for the imaging lens to favorably correct various aberrations.

$$-2.1 < r3r/f < -1.2 \qquad (1)$$

In addition, the imaging apparatus of the present disclosure is equipped with the imaging lens of the present disclosure. Therefore, the imaging apparatus of the present disclosure is capable of obtaining images having high image quality.

BRIEF DESCRIPTION OF THE DRAWINGS

FIG. 1 is a cross sectional diagram that illustrates the lens configuration of an imaging lens according to an embodiment of the present disclosure (common with an imaging lens of Example 1).

FIG. 2 is a cross sectional diagram that illustrates the lens configuration of an imaging lens according to Example 2 of the present disclosure.

FIG. 3 is a cross sectional diagram that illustrates the lens configuration of an imaging lens according to Example 3 of the present disclosure.

FIG. 4 is a cross sectional diagram that illustrates the lens configuration of an imaging lens according to Example 4 of the present disclosure.

FIG. 5 is a cross sectional diagram that illustrates the lens configuration of an imaging lens according to Example 5 of the present disclosure.

DETAILED DESCRIPTION OF THE PREFERRED EMBODIMENTS

Figure 6:
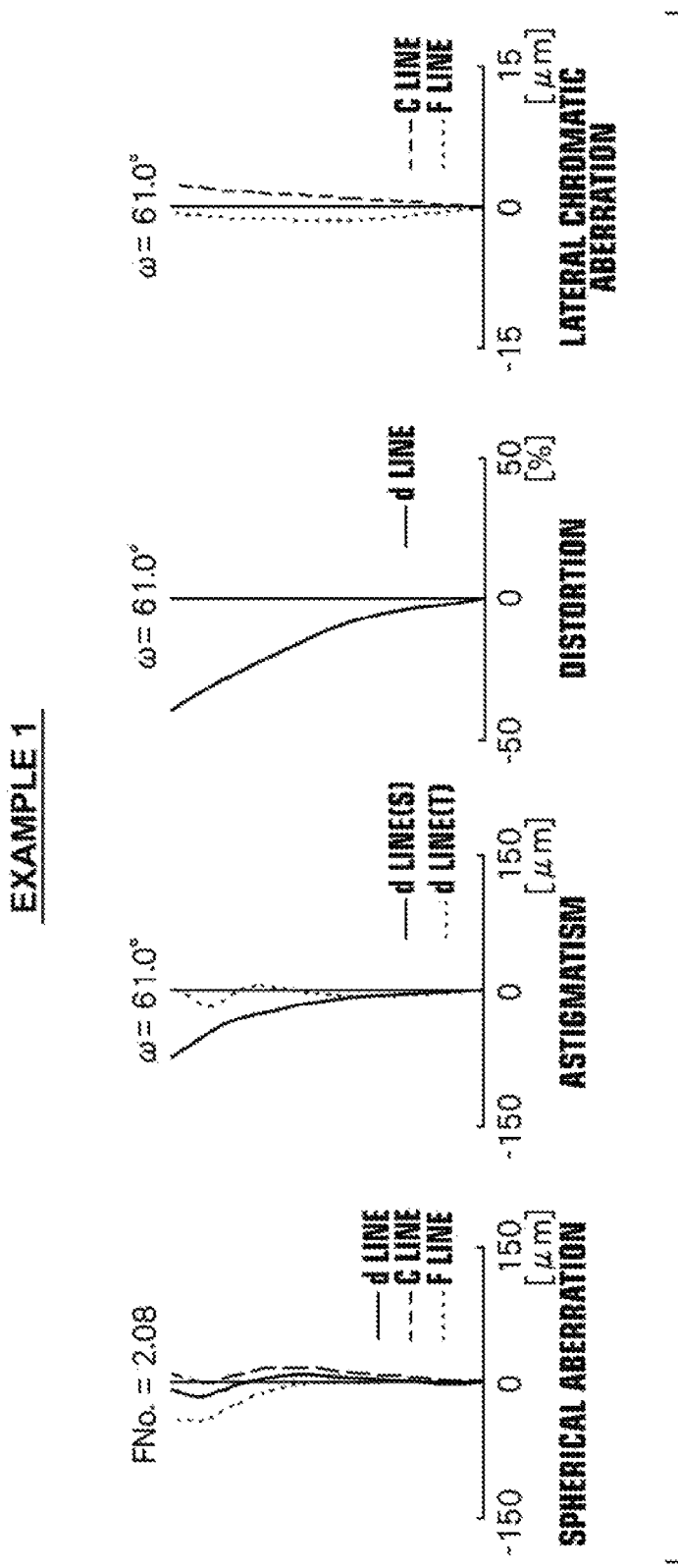
FIG. 6 is a collection of diagrams that illustrate various aberrations of the imaging lens of Example 1.

Hereinafter, embodiments of the present disclosure will be described in detail with reference to the attached drawings. FIG. 1 is a cross sectional diagram that illustrates the lens configuration of an imaging lens according to an embodiment of the present disclosure. The example of the configuration illustrated in FIG. 1 corresponds to the configuration of an imaging lens of Example 1 to be described later. In FIG. 1, the left side is the object side, and the right side is the image side. Note that the aperture stop St illustrated in FIG. 1 does not necessarily represent the size or shape thereof, but merely indicates the position of the aperture stop St along an optical axis Z. In addition, FIG. 1 also illustrates an axial light beam wa and a light beam wb at a maximum angle of view.

As illustrated in FIG. 1, this imaging lens is constituted by, in order from the object side to the image side, a first lens L1 having a negative refractive power and a concave surface toward the image side; a second lens L2 having a negative refractive power; a third lens L3 having a positive refractive power and a convex surface toward the image side; a fourth lens L4 having a negative refractive power and a concave surface toward the image side; a biconvex fifth lens L5 which is cemented to the fourth lens L4; and a sixth lens L6 having a negative refractive power and a concave surface toward the object side.

By configuring the imaging lens such that the first lens L1 and the second lens L2 are negative lenses while the third lens L3 is a positive lens, a widening of the angle of view can be achieved without generating higher order aberrations, and the generation of a large amount of negative distortion can be suppressed. Further, by configuring the surface toward the image side of the first lens L1 to be concave, principal light rays of peripheral light beams, which are refracted by the surface toward the object side in directions away from the optical axis in order to widen the angle of view and to correct negative distortion, will be prevented from being refracted in directions toward the optical axis by the surface toward the image side, thereby contributing the correction of distortion. By configuring the surface toward the image side of the first lens L1 to be concave in this manner, principal light rays can be caused to enter the third lens L3 while preventing the principal light rays from being refracted in directions toward the optical axis. Therefore, a widening of the angle of view can be achieved while suppressing the generation of higher order aberrations and suppressing the generation of a large amount of negative distortion.

In addition, effective correction of chromatic aberrations will become possible, by forming the fourth lens L4 and the fifth lens L5 as a cemented lens with a coupling surface which is concave toward the image side.

In addition, negative spherical aberration which is generated from the third lens L3 through the fifth lens L5 can be corrected, by configuring the sixth lens L6 to be a negative lens.

Further, the imaging lens of the present disclosure is configured such that Conditional Formula (1) below is satisfied. Satisfying Conditional Formula (1) causes the principal light ray of each light beam to be refracted toward the vicinity of the optical axis by the surface toward the image side of the third lens L3, thereby realizing favorable correction of aberrations by the fourth lens L4 through the sixth lens L6. By Conditional Formula (1) being satisfied, the principal light ray of each light beam can be returned to the fourth lens L4 without higher order aberration being generated. Therefore, the aperture stop St can be provided at a position remote from an image formation plane, light rays at each angle of view can be separated and aberrations can be corrected by the lenses toward the image side of the aperture stop St. As a result, high imaging performance can be obtained. Note that more favorable properties can be obtained if Conditional Formula (1-1) below is satisfied.

$$-2.1 < r3r/f < -1.2 \qquad (1)$$

$$-2.0 < r3r/f < -1.45 \qquad (1\text{-}1)$$

wherein r3r is the radius of curvature of the surface toward the image side of the third lens, and f is the focal length of the entire lens system.

The imaging lens of the present embodiment is configured as described above. Therefore, a wide angle imaging lens having high resolution as a whole can be realized.

In the imaging lens of the present embodiment, it is preferable for Conditional Formula (2) to be satisfied. By configuring the imaging lens such that the value of f12/f is not less than or equal to the lower limit defined in Conditional Formula (2), the combined negative refractive power of the first lens L1 and the second lens L2 can be prevented from becoming excessively weak, which contributes to achieving a widening of the angle of view. In addition, by configuring the imaging lens such that the value of f12/f is not greater than or equal to the upper limit defined in Conditional Formula (2), the combined negative refractive power of the first lens L1 and the second lens L2 can be prevented from becoming excessively strong, that is, the absolute values of the radii of curvature of the surfaces of these lenses can be prevented from becoming excessively small. As a result, the generation of higher order aberrations can be suppressed. Note that more favorable properties can be obtained if Conditional Formula (2-1) below is satisfied.

$$-1.05 < f12/f < -0.8 \qquad (2)$$

$$-1.0 < f12/f < -0.85 \qquad (2\text{-}1)$$

wherein f12 is the combined focal length of the first lens and the second lens, and f is the focal length of the entire lens system.

In addition, it is preferable for Conditional Formula (3) below to be satisfied. By distributing the negative refractive power necessary to widen the angle of view between the first lens L1 and the second lens L2 such that Conditional Formula (3) is satisfied, light rays that enter from wide angles of view can be refracted in a stepwise manner to the aperture stop St, which is positioned at the image side of the second lens L2. As a result, a widening of the angle of view can be achieved without higher order aberrations being generated. In addition, principal light rays of peripheral light beams that enter the third lens L3 after passing through the second lens L2 can be prevented from being refracted in a direction toward the optical axis. Therefore, generation of a large amount of negative distortion can be suppressed. Note that more favorable properties can be obtained if Conditional Formula (3-1) below is satisfied.

$$0.7 < f1/f2 < 2.0 \qquad (3)$$

$$0.8 < f1/f2 < 1.2 \qquad (3\text{-}1)$$

wherein f1 is the focal length of the first lens, and f2 is the focal length of the second lens.

In addition, it is preferable for the second lens L2 to be of a biconcave shape. By adopting this configuration, the angles between light rays that enter the second lens L2 and a line normal to a plane at the point where the light rays pass through the surface toward the object side of the second lens L2 can be maintained small. As a result, the generation of a large amount of positive spherical aberration can be suppressed, even in the case that the second lens L2 is imparted with a strong refractive power in order to widen the angle of view and to correct distortion.

In addition, it is preferable for Conditional Formula (4) below to be satisfied. By configuring the imaging lens such that the value of f2/f is not less than or equal to the lower limit defined in Conditional Formula (4), the refractive power of the second lens L2 can be set strong. As a result, a widening of the angle of view is facilitated. Alternatively, because the configuration will have more retro focus properties, a comparatively long amount of back focus can be secured. By increasing the length of the back focus, insertion of filters and the like will be facilitated, and preventing the generation of stray light caused by reflection at the surface of a sensor (an imaging element provided at the image formation plane Sim) will be facilitated. By configuring the imaging lens such that the value of f2/f is not greater than or equal to the upper limit defined in Conditional Formula (4), the refractive power of the second lens L2 can be prevented from becoming excessively strong, thereby preventing drastic refraction of light rays. As a result, the generation of higher order aberrations, particularly with respect to light rays at peripheral portions, can be suppressed. Note that more favorable properties can be obtained if Conditional Formula (4-1) below is satisfied.

$$-2.8 < f2/f < -1.3 \qquad (4)$$

$$-2.5 < f2/f < -1.5 \qquad (4\text{-}1)$$

wherein f2 is the focal length of the second lens, and f is the focal length of the entire lens system.

In addition, it is preferable for Conditional Formula (5) below to be satisfied. It is important for the third lens L3 to correct a large amount of positive spherical aberration generated at the first lens L1 and the second lens L2, while returning principal light rays of peripheral light beams, which have been refracted by the first lens L1 and the second lens L2 in directions away from the optical axis in order to favorably correct distortion, toward the vicinity of the optical axis, to enable favorable correction of various aberrations by the fourth lens L4 and the lenses more toward the image side therefrom. By configuring the imaging lens such that the value of f123/f is not less than or equal the lower limit defined in Conditional Formula (5), the positive refractive power of the third lens L3 can be prevented from becoming excessively strong, and therefore, spherical aberration can be prevented from being excessively corrected. By configuring the imaging lens such that the value of f123/f is not greater than or equal the upper limit defined in Conditional Formula (5), the positive refractive power of the third lens L3 can be prevented from becoming excessively weak, and light beams can be appropriately refracted toward the optical axis. Therefore, light beams of each angle of view can be separated and aberrations can be corrected by the fourth lens L4 and lenses more toward the image side thereof. As a result, favorable performance can be obtained. Note that more favorable properties can be obtained if Conditional Formula (5-1) below is satisfied.

$$2.5 < f123/f < 5.0 \tag{5}$$

$$3.0 < f123/f < 4.5 \tag{5-1}$$

wherein f123 is the combined focal length of the first lens, the second lens, and the third lens, and f is the focal length of the entire lens system.

In addition, it is preferable for Conditional Formula (6) below to be satisfied. By configuring the imaging lens such that the value of r3f/f is not less than or equal to the lower limit defined in Conditional Formula (6), the radius of curvature of the surface toward the object side of the third lens L3 can be prevented from becoming excessively small. Therefore, an increase in negative distortion can be suppressed without causing higher order aberrations to be generated. In addition, by configuring the imaging lens such that the value of r3f/f is not greater than or equal to the upper limit defined in Conditional Formula (6), the radius of curvature of the surface toward the object side of the third lens L3 can be prevented from becoming excessively large. Therefore, principal light rays of peripheral light beams can be prevented from being refracted in directions away from the optical axis. As a result, it will not be necessary to set the radius of curvature of the surface toward the image side of the third lens L3 to be excessively small in order to cause the principal light rays of each light beam to be refracted toward the vicinity of the optical axis. As a result, the generation of higher order aberrations can be suppressed. Note that more favorable properties can be obtained if Conditional Formula (6-1) below is satisfied.

$$2.0 < r3f/f < 6.0 \tag{6}$$

$$2.5 < r3f/f < 5.0 \tag{6-1}$$

wherein r3f is the radius of curvature of the surface toward the object side of the third lens, and f is the focal length of the entire lens system.

In addition, it is preferable for Conditional Formula (7) below to be satisfied. Satisfying Conditional Formula (7) enables favorable correction of aberrations to be realized. By configuring the imaging lens such that the value of r45/f is not less than or equal to the lower limit defined in Conditional Formula (7), the radius of curvature of the coupling surface between the fourth lens L4 and the fifth lens L5 can be prevented from becoming excessively small. Therefore, generation of a large amount of negative spherical aberration can be prevented. In addition, the angles formed by peripheral light rays and lines normal to planes at the points where the light rays pass through the coupling surface can be prevented from becoming excessively large. Therefore, favorable correction of lateral chromatic aberration will become possible without causing higher order aberrations to be generated. By configuring the imaging lens such that the value of r45/f is not greater than or equal to the upper limit defined in Conditional Formula (7), the radius of curvature of the coupling surface between the fourth lens L4 and the fifth lens L5 can be prevented from becoming excessively large. Therefore, longitudinal chromatic aberration being insufficiently corrected can be prevented. In addition, the angles formed by peripheral light rays and lines normal to planes at the points where the light rays pass through the coupling surface can be prevented from becoming excessively small. Therefore, favorable correction of lateral chromatic aberration will become possible. Note that more favorable properties can be obtained if Conditional Formula (7-1) below is satisfied.

$$0.5 < r45/f < 0.75 \tag{7}$$

$$0.55 < r45/f < 0.7 \tag{7-1}$$

wherein r45 is the radius of surface of the coupling surface between the fourth lens and the fifth lens, and f is the focal length of the entire lens system.

In addition, it is preferable for Conditional Formula (8) below to be satisfied. By configuring the imaging lens such that the value of f6/f is not less than or equal to the lower limit defined in Conditional Formula (8), the refractive power of the sixth lens L6 can be prevented from becoming excessively strong, and it will become possible to cause light rays, particularly of light beams at peripheral portions, to be refracted away from the optical axis without causing higher order aberrations to be generated. As a result, the effective diameter of the cemented lens formed by the fourth lens L4 and the fifth lens L5 can be maintained small. Therefore, the radius of curvature of the coupling surface can be set small, and favorable correction of various aberrations will become possible. In addition, by configuring the imaging lens such that the value of f6/f is not greater than or equal to the upper limit defined in Conditional Formula (8), the refractive power of the sixth lens L6 can be prevented from becoming excessively weak, and correction of positive spherical aberration will be possible. In addition, the refractive power of the coupling surface between the fourth lens L4 and the fifth lens L5 can be increased while correcting negative spherical aberration which is generated at the coupling surface. Therefore, favorable correction of aberrations will become possible. Note that more favorable properties can be obtained if Conditional Formula (8-1) below is satisfied.

$$-5.5 < f6/f < -2.5 \tag{8}$$

$$-5.0 < f6/f < -3.0 \tag{8-1}$$

wherein f6 is the focal length of the sixth lens, and f is the focal length of the entire lens system.

In addition, it is preferable for Conditional Formula (9) below to be satisfied. By configuring the imaging lens such that Conditional Formula (9) is satisfied, by distributing refractive powers appropriately among each of the lenses, and by not utilizing materials having high production sensitivities that would result in higher order aberrations being generated, a loosening of production tolerances will become possible, and production of imaging lenses having small fluctuations in performance will be facilitated. Note that more favorable properties can be obtained if Conditional Formula (9-1) below is satisfied.

$$0.85 < \max.|f/fx| < 1.2 \qquad (9)$$

$$0.9 < \max.|f/fx| < 1.1 \qquad (9\text{-}1)$$

wherein f is the focal length of the entire lens system, and fx is the focal length of an xth lens (x is an integer within a range from 1 to 6). Note that "max. |f/fx|" means the maximum value from among the values of "|f/fx|" for the first lens through the sixth lens.

In addition, it is preferable for a protective multiple layer film coating to be administered in the case that the present imaging lens is to be utilized in extreme environments. Further, an antireflection coating may be administered in addition to the protective coating, in order to reduce ghost light and the like during utilization of the imaging lens.

In addition, in the case that this imaging lens is applied to an imaging apparatus, it is preferable for a cover glass, prisms, and various filters, such as an infrared cutoff filter and a low pass filter, to be provided between the lens system and an image formation plane Sim, depending on the configuration of the imaging apparatus. Note that these filters may be provided among the lenses instead of being provided between the lens system and the image formation plane Sim. As a further alternative, coatings that exhibit the same effects as these filters may be administered on the lens surfaces of the lenses.

Next, examples of numerical values of the imaging lens of the present disclosure will be described.

First, an imaging lens of Example 1 will be described. FIG. 1 is a cross sectional diagram that illustrates the lens configuration of the imaging lens of Example 1. Note that in FIG. 1 and FIGS. 2 through 5 that correspond to Examples 2 through 5 to be described later, the left side is the object side and the right side is the image side. In addition, the aperture stops St illustrated in FIGS. 1 through 5 do not necessarily represent the sizes and shapes thereof, but only the positions thereof along the optical axis Z.

Basic lens data are shown in Table 1, data related to various items are shown in Table 2, and data related to aspherical surface coefficients are shown in Table 3 for the imaging lens of Example 1. The meanings of the symbols in the tables will be described for Example 1 as an example, but the meanings are basically the same for Examples 2 through 5 as well.

In the lens data of Table 1, surface numbers that sequentially increase with the surface of the constituent element most toward the object side being designated as 1 are listed in the column Surface Number; the radii of curvature of each surface are listed in the column Radius of Curvature; and distances along the optical axis Z between each surface and a surface adjacent thereto are listed in the column Distance. In addition, the refractive indices with respect to the d line (wavelength: 587.6 nm) of each constituent element are listed in the column nd; and the Abbe's numbers with respect to the d line (wavelength: 587.6 nm) of each constituent element are listed in the column vd.

Here, the signs of the radii of curvature are positive in cases that the surface shape is convex toward the object side, and negative in cases that the surface shape is convex toward the image side. Table 1 also shows data regarding the aperture stop St. Text reading "(Stop)" is indicated along with a surface number in the column of the surface number at the surface corresponding to the aperture stop.

The values of the focal length f of the entire lens system, the back focus Bf, the F value F No., and the full angle of view 2ω are shown as data related to various items in Table 2.

In the basic lens data and the data related to various items, degrees are used as the units for angles and mm are used as the units for lengths. However, it is possible for optical systems to be proportionately enlarged or proportionately reduced and utilized. Therefore, other appropriate units may be used.

In the lens data of Table 1, the surface numbers of aspherical surfaces are appended with the mark "*", and numerical values that represent paraxial radii of curvature are shown as the radii of curvature of the aspherical surfaces. The data related to aspherical surface coefficients of Table 3 show the surface numbers of the aspherical surfaces, and the aspherical surface coefficients related to these aspherical surfaces. The aspherical surface coefficients are the values of the coefficients KA and Am (m=3, . . . , 20) in the aspherical surface formula below.

$$Zd = C \cdot h^2 / \{1 + (1 - KA \cdot C^2 \cdot h^2)^{1/2}\} + \Sigma Am \cdot h^m$$

wherein Zd is the depth of the aspherical surface (the length of a normal line that extends from a point on the aspherical surface at a height h to a plane perpendicular to the optical axis that contacts the apex of the aspherical surface), h is the height (the distance from the optical axis), C is the inverse of the paraxial radius of curvature, and KA and Am are aspherical surface coefficients (m=3, . . . , 20).

TABLE 1

Example 1: Lens Data

| Surface Number | Radius of Curvature | Distance | nd | vd |
|---|---|---|---|---|
| 1 | 20.4734 | 1.5000 | 1.75500 | 52.32 |
| 2 | 4.7938 | 1.9000 | | |
| *3 | −18.3582 | 0.7766 | 1.53409 | 55.87 |
| *4 | 3.2853 | 1.1897 | | |
| 5 | 8.9279 | 4.5085 | 1.71700 | 47.93 |
| 6 | −5.0292 | 0.1500 | | |
| 7 (stop) | ∞ | 1.0108 | | |
| *8 | 4.9124 | 1.1317 | 1.63360 | 23.61 |
| *9 | 1.9494 | 3.3347 | 1.53409 | 55.87 |
| *10 | −5.7128 | 0.3176 | | |
| *11 | −8.6379 | 0.9999 | 1.63360 | 23.61 |
| *12 | −254.2142 | 2.9451 | | |

TABLE 2

Example 1: Items (d line)

| | |
|---|---|
| f | 3.12 |
| Bf | 2.95 |
| F No. | 2.08 |
| 2ω [°] | 122.0 |

TABLE 3

Example 1: Aspherical Surface Coefficients

Surface Number

| | 3 | 4 | 8 | 9 | 10 | 11 | 12 |
|---|---|---|---|---|---|---|---|
| KA | −5.0805849E+00 | 3.5923752E−01 | −1.1540757E+00 | −4.8483951E−01 | 1.6370630E+00 | −9.8193444E+00 | −1.0000000E+01 |
| A3 | 4.8992018E−16 | 1.2938543E−15 | −2.0051297E−17 | 0.0000000E+00 | −1.4782273E−15 | 2.0223931E−18 | −1.4277065E−17 |
| A4 | 2.2186548E−02 | 4.6115748E−02 | −2.0404639E−04 | 1.1328695E−02 | −9.6862007E−02 | −7.9869498E−02 | −1.1737517E−02 |
| A5 | −5.7914687E−02 | −1.4088254E−01 | −3.3988595E−03 | −4.8246927E−02 | 2.5876587E−01 | 2.1876672E−02 | −4.1661550E−02 |
| A6 | 6.0168484E−02 | 2.1887231E−01 | 1.3370773E−02 | 5.1593916E−02 | −4.3804370E−01 | 3.4458855E−02 | 2.6109202E−02 |
| A7 | −3.0602647E−02 | −1.9301048E−01 | −1.6848285E−02 | 2.6530301E−02 | 4.5629780E−01 | −1.0294869E−02 | 3.5905134E−02 |
| A8 | 6.8723190E−03 | 1.0690938E−01 | 9.1078448E−03 | −7.6449555E−02 | −2.4812403E−01 | −1.6354867E−02 | −2.8230719E−02 |
| A9 | 3.2189528E−04 | −3.3437871E−02 | −3.9229415E−04 | 4.2621704E−02 | 2.4097506E−02 | 4.6599412E−03 | −1.3335406E−02 |
| A10 | −5.3353927E−04 | 4.6858839E−04 | −1.7410523E−03 | 2.0539238E−03 | 4.6908885E−02 | 6.5980632E−03 | 1.4157899E−02 |
| A11 | 1.0045497E−04 | 4.4489595E−03 | 6.1094575E−04 | −1.0712420E−02 | −2.2172654E−02 | −1.3488746E−03 | 2.7557838E−03 |
| A12 | 1.9444374E−06 | −1.6248931E−03 | 5.2676088E−05 | 3.6830262E−03 | 5.1170906E−04 | −1.7522256E−03 | −4.0104542E−03 |
| A13 | −3.3544870E−06 | 7.1766534E−05 | −7.2790532E−05 | 2.6224684E−04 | 2.0239326E−03 | 2.4344545E−04 | −3.2603078E−04 |
| A14 | 4.2403921E−07 | 8.9422542E−05 | 1.0912115E−05 | −5.4121569E−04 | −4.8327343E−04 | 2.8980583E−04 | 6.9406726E−04 |
| A15 | 1.4163425E−08 | −2.0831440E−05 | 2.8558248E−06 | 1.1865571E−04 | −7.9906510E−06 | −2.6964951E−05 | 2.0515258E−05 |
| A16 | −8.3841672E−09 | 6.5100450E−07 | −1.0041659E−06 | 2.0999119E−05 | 2.3609100E−05 | −2.9010523E−05 | −7.3022736E−05 |
| A17 | 6.0674665E−10 | 3.7113447E−07 | 3.6228480E−09 | −1.1359594E−05 | −5.1416120E−06 | 1.6704429E−06 | −5.2321160E−07 |
| A18 | 3.0858192E−11 | −7.8298262E−08 | 2.7616935E−08 | 5.0731479E−07 | 1.2307590E−07 | 1.6133017E−06 | 4.2901853E−06 |
| A19 | −5.9852211E−12 | 9.5908922E−09 | −1.7334260E−09 | 3.0678491E−07 | 1.4459396E−07 | −4.4067564E−08 | −8.6987039E−10 |
| A20 | 2.1570408E−13 | −5.6167875E−10 | −1.5621942E−10 | −3.6155090E−08 | −1.7770446E−08 | −3.8285075E−08 | −1.0778801E−07 |

FIG. 6 is a collection of diagrams that illustrate aberrations of the imaging lens of Example 1. Note that in FIG. 6, diagrams that illustrate spherical aberration, astigmatism, distortion, and lateral chromatic aberration are illustrated in this order from the left side of the drawing sheet. These diagrams illustrate aberrations in a state in which the object distance is infinity. The diagrams that illustrate spherical aberration, astigmatism, and distortion show aberrations with the d line (wavelength: 587.6 nm) as a reference wavelength. The diagram that illustrates spherical aberration shows aberrations related to the d line (wavelength: 587.6 nm), the C line (wavelength: 656.3 nm), and the F line (wavelength: 486.1 nm), as a black solid line, a long broken line, and a dotted line, respectively. In the diagram that illustrates astigmatism, aberrations in the sagittal direction and aberrations in the tangential direction related to the d line are indicated by a solid line and a dotted line, respectively. In the diagram that illustrates lateral chromatic diagram, aberrations related to the C line (wavelength: 656.3 nm) and the F line (wavelength: 486.1 nm) are shown as a long broken line and a dotted line, respectively. In the diagram that illustrates spherical aberration, "F No." denotes the F number. In the other diagrams that illustrate the aberrations, ω denotes half angles of view.

Figure 11:
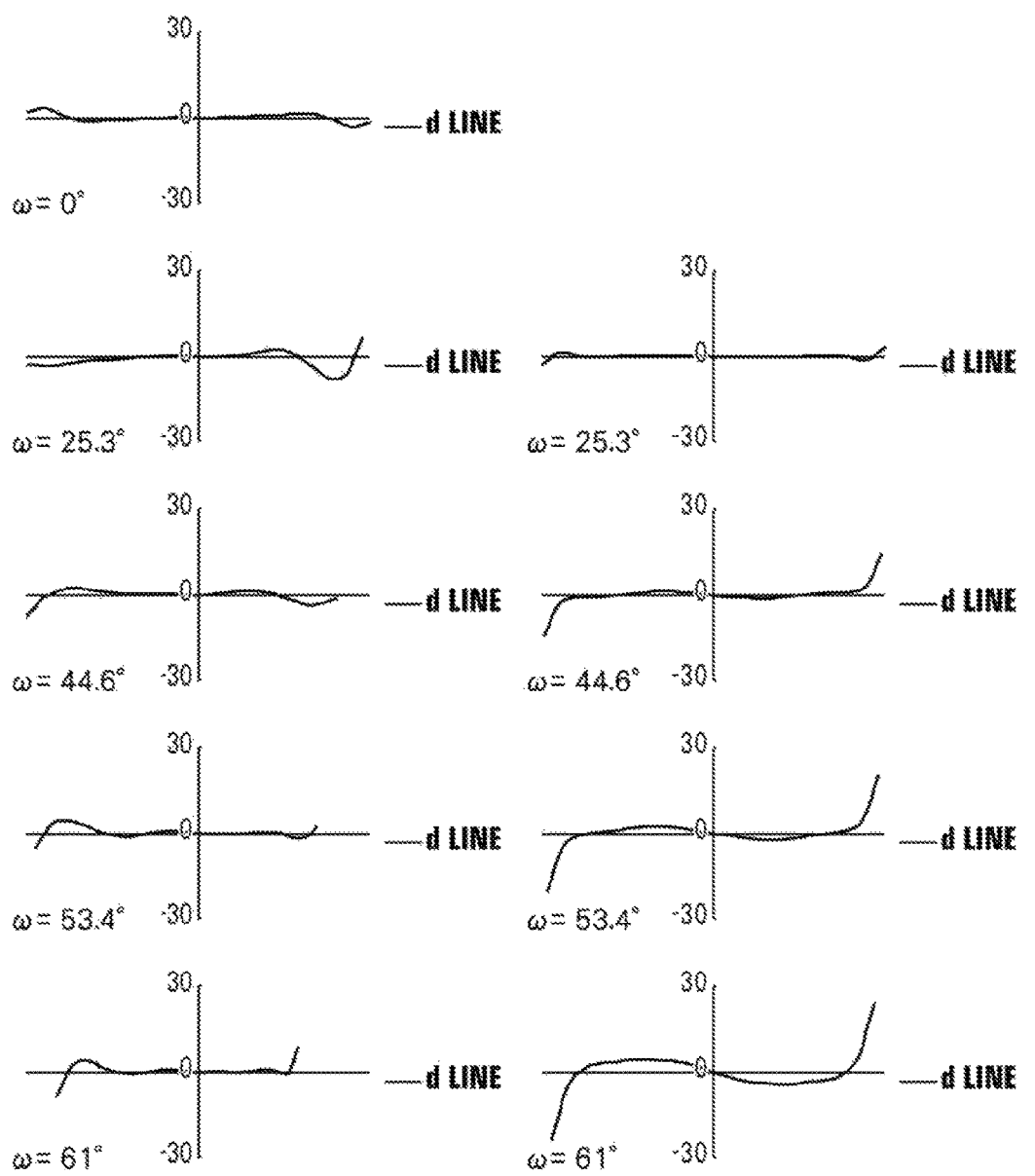
FIG. 11 is a collection of diagrams that illustrate transverse aberrations of the imaging lens of Example 1.

FIG. 11 is a collection of diagrams that illustrate transverse aberrations of the imaging lens of Example 1. The diagrams that illustrate transverse aberration with the d line (wavelength: 587.6 nm) are shown in two columns to the right and left. The diagrams in the left column illustrate aberrations related to the tangential direction, and the diagrams in the right column illustrate aberrations related to the sagittal direction. In addition, the transverse aberration diagrams are for states in which the object distance is infinity. The symbol "ω" in the transverse aberration diagrams represent half angles of view.

The symbols, the meanings, and the manners in which the various pieces of data are described in the description of Example 1 above are the same for the examples to be described below unless otherwise noted. Therefore, redundant descriptions will be omitted hereinafter.

Figure 7:
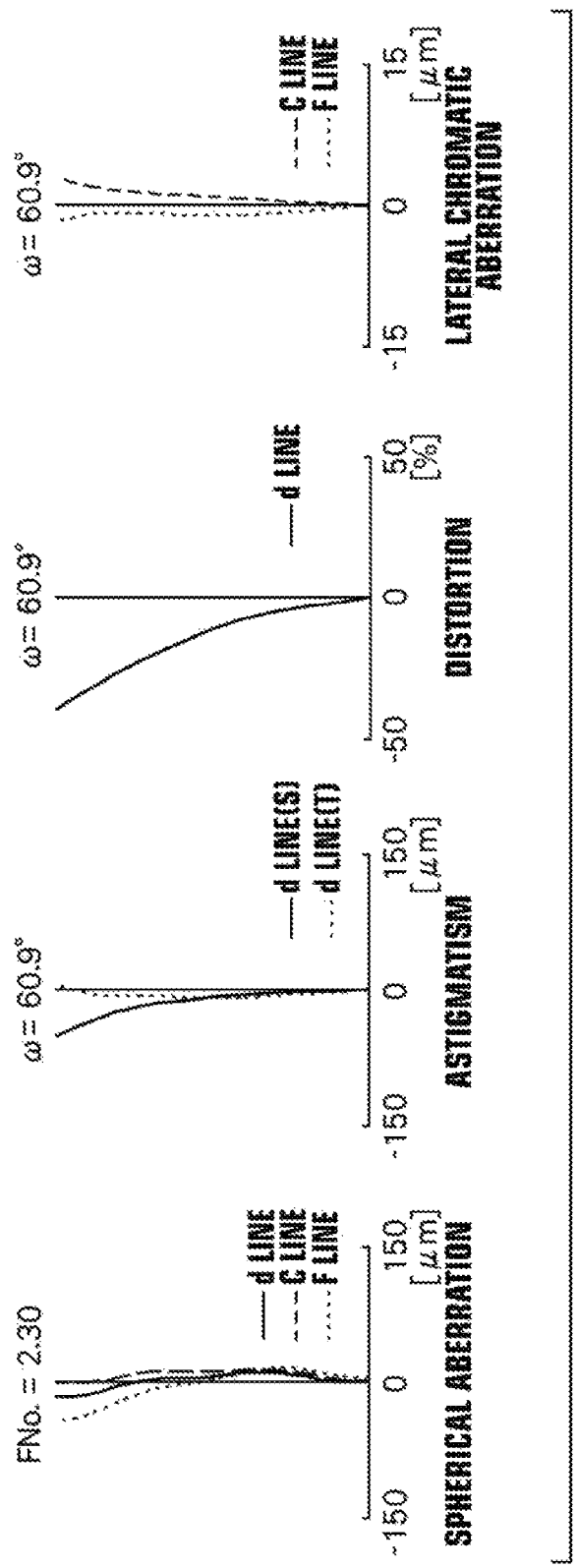
FIG. 7 is a collection of diagrams that illustrate various aberrations of the imaging lens of Example 2.
Figure 12:
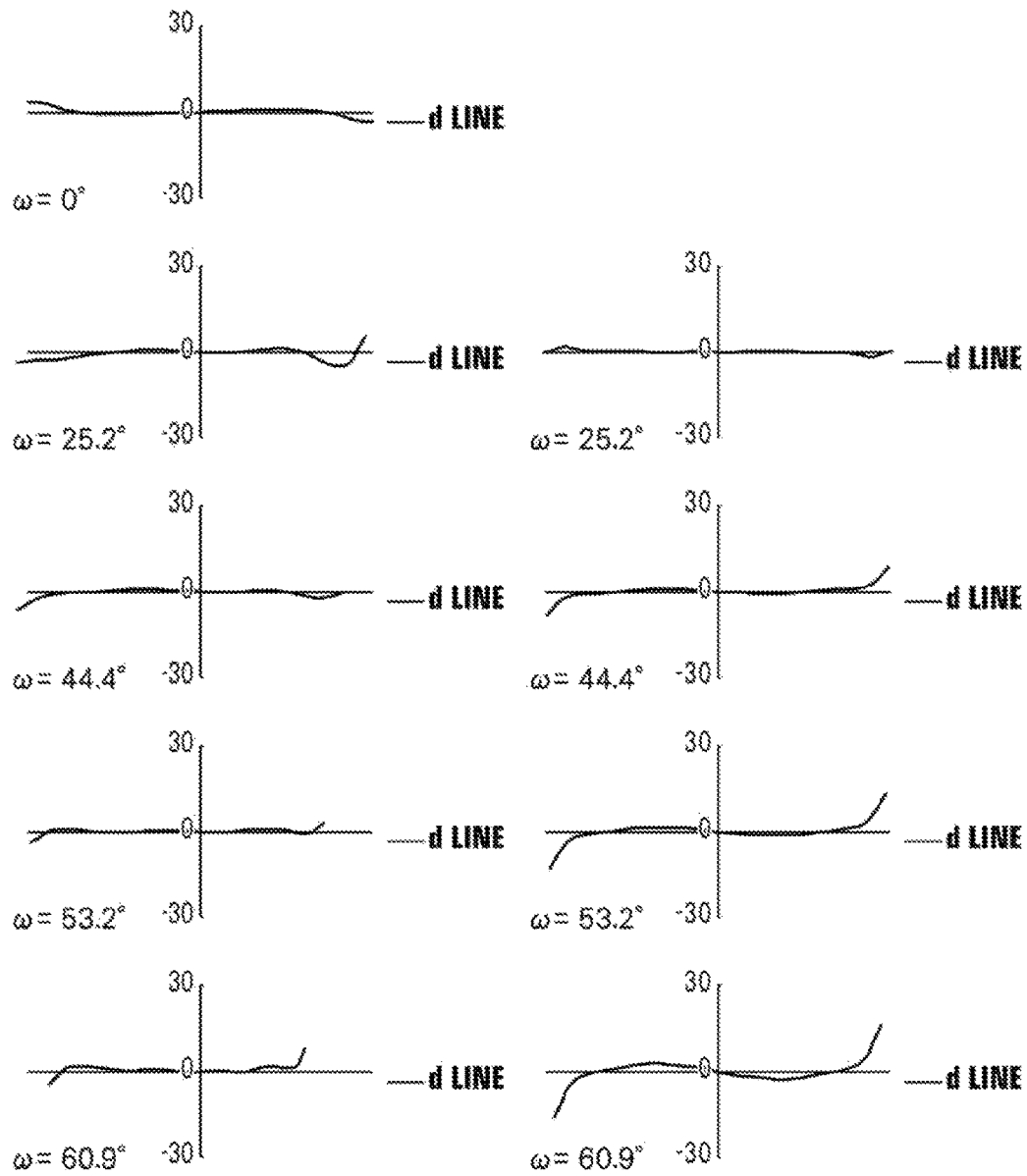
FIG. 12 is a collection of diagrams that illustrate transverse aberrations of the imaging lens of Example 2.

Next, an imaging lens of Example 2 will be described. FIG. 2 is a cross sectional diagram that illustrates the lens configuration of the imaging lens of Example 2. Basic lens data are shown in Table 4, data related to various items are shown in Table 5, and data related to aspherical surface coefficients are shown in Table 6 for the imaging lens of Example 2. In addition, FIG. 7 is a collection of diagrams that illustrate various aberrations and FIG. 12 is a collection of diagrams that illustrate transverse aberrations of the imaging lens of Example 2.

TABLE 4

Example 2: Lens Data

| Surface Number | Radius of Curvature | Distance | Nd | νd |
|---|---|---|---|---|
| 1 | 21.5732 | 1.5000 | 1.75500 | 52.32 |
| 2 | 3.9583 | 1.9000 | | |
| *3 | −8.4168 | 0.7766 | 1.53409 | 55.87 |
| *4 | 6.8498 | 0.9366 | | |
| 5 | 13.1042 | 4.6004 | 1.71700 | 47.93 |
| 6 | −5.0330 | 0.1500 | | |
| 7 (stop) | ∞ | 1.1358 | | |
| *8 | 4.5986 | 1.1077 | 1.63360 | 23.61 |
| *9 | 1.9180 | 3.1308 | 1.53409 | 55.87 |
| *10 | −6.2822 | 0.3140 | | |
| *11 | −8.6290 | 1.0026 | 1.63360 | 23.61 |
| *12 | 503980.0784 | 3.2304 | | |

TABLE 5

Example 2: Items (d line)

| | |
|---|---|
| f | 3.13 |
| Bf | 3.23 |
| F No. | 2.30 |
| 2ω [°] | 121.8 |

TABLE 6

Example 2: Aspherical Surface Coefficients

| | Surface Number | | | | | | |
|---|---|---|---|---|---|---|---|
| | 3 | 4 | 8 | 9 | 10 | 11 | 12 |
| KA | −9.7540913E+00 | 9.2954523E−01 | −1.4033441E+00 | −1.0054871E+00 | 3.1640530E−01 | −1.0000009E+01 | −6.8189221E+00 |
| A3 | −1.7534973E−15 | 1.2177192E−14 | 4.6479963E−17 | −8.0201587E−16 | 1.9367763E−15 | 9.5334139E−18 | −1.4853883E−17 |
| A4 | 3.5580053E−02 | 5.0800274E−02 | −9.1635164E−05 | 3.3504335E−02 | −9.8210139E−02 | −7.5756712E−02 | −1.1915383E−02 |
| A5 | −7.7142412E−02 | −1.2560385E−01 | −2.9042146E−03 | −7.8512630E−02 | 2.6318123E−01 | 1.7331125E−02 | −3.4751604E−02 |
| A6 | 8.1856901E−02 | 1.8990095E−01 | 1.5551424E−02 | 5.8729902E−02 | −4.5327279E−01 | 2.5276835E−02 | 1.9314993E−02 |
| A7 | −4.4011525E−02 | −1.6488037E−01 | −2.0362526E−02 | 4.7084434E−02 | 4.6991786E−01 | −3.5456310E−03 | 2.8608992E−02 |
| A8 | 1.0542915E−02 | 8.9999021E−02 | 1.0980104E−02 | −9.1655619E−02 | −2.5327761E−01 | −1.3327180E−02 | −2.0323161E−02 |
| A9 | 4.9937772E−04 | −2.7858418E−02 | −3.5480426E−04 | 4.0970976E−02 | 2.4829528E−02 | 9.8222330E−04 | −9.5232831E−03 |
| A10 | −9.1045490E−04 | 5.0537789E−04 | −2.1937661E−03 | 5.9334968E−03 | 4.7763524E−02 | 6.6721811E−03 | 9.5064483E−03 |
| A11 | 1.8006624E−04 | 3.5494706E−03 | 7.7404526E−04 | −1.0969611E−02 | −2.3150591E−02 | −3.2567356E−04 | 1.6736399E−03 |
| A12 | 4.1271233E−06 | −1.2825593E−03 | 6.6805410E−05 | 3.4065757E−03 | 7.6205264E−04 | −2.0397429E−03 | −2.4717124E−03 |
| A13 | −6.6701399E−06 | 5.1570212E−05 | −9.7393635E−05 | 1.8417394E−04 | 2.1295787E−03 | 8.2375539E−05 | −1.4888163E−04 |
| A14 | 8.6814757E−07 | 6.8946241E−05 | 1.5605134E−05 | −5.3429973E−04 | −5.3905550E−04 | 3.7122152E−04 | 3.9152367E−04 |
| A15 | 3.1378525E−08 | −1.4980435E−05 | 3.9782319E−06 | 1.4681997E−04 | −8.2407360E−06 | −1.2787132E−05 | 3.9095434E−06 |
| A16 | −1.9071816E−08 | 3.0783947E−07 | −1.4932335E−06 | 1.8372799E−05 | 2.7168098E−05 | −3.9988878E−05 | −3.7932498E−05 |
| A17 | 1.4858180E−09 | 2.5552328E−07 | 8.9648154E−09 | −1.3885925E−05 | −5.5165652E−06 | 1.0387041E−06 | 2.9782412E−07 |
| A18 | 7.5009302E−11 | −4.8714362E−08 | 4.3137744E−08 | 8.5835426E−07 | 5.5617570E−08 | 2.3607735E−06 | 2.0754408E−06 |
| A19 | −1.6294072E−11 | 6.3809377E−09 | −2.7799331E−09 | 3.7965081E−07 | 1.5626667E−07 | −3.3655062E−08 | −1.7246222E−08 |
| A20 | 6.4019669E−13 | −4.1799244E−10 | −2.6070672E−10 | −4.8533285E−08 | −1.8023384E−08 | −5.8880437E−08 | −4.9188247E−08 |

Figure 8:
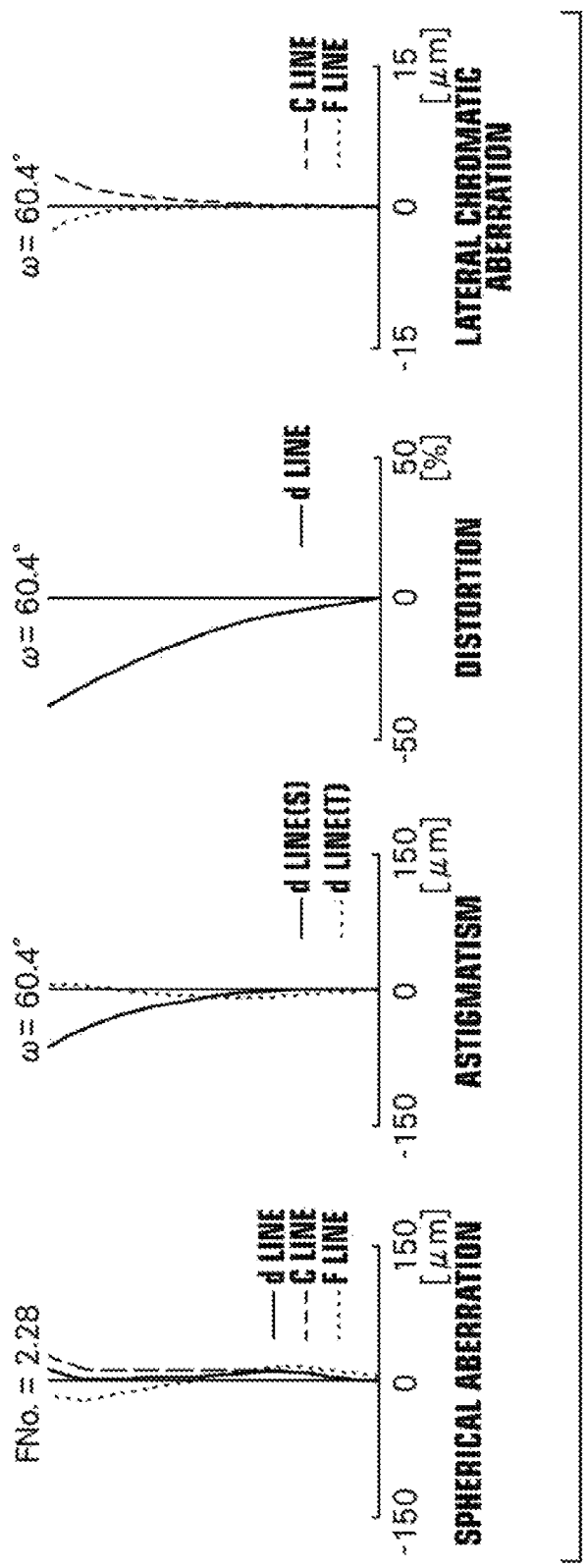
FIG. 8 is a collection of diagrams that illustrate various aberrations of the imaging lens of Example 3.
Figure 13:
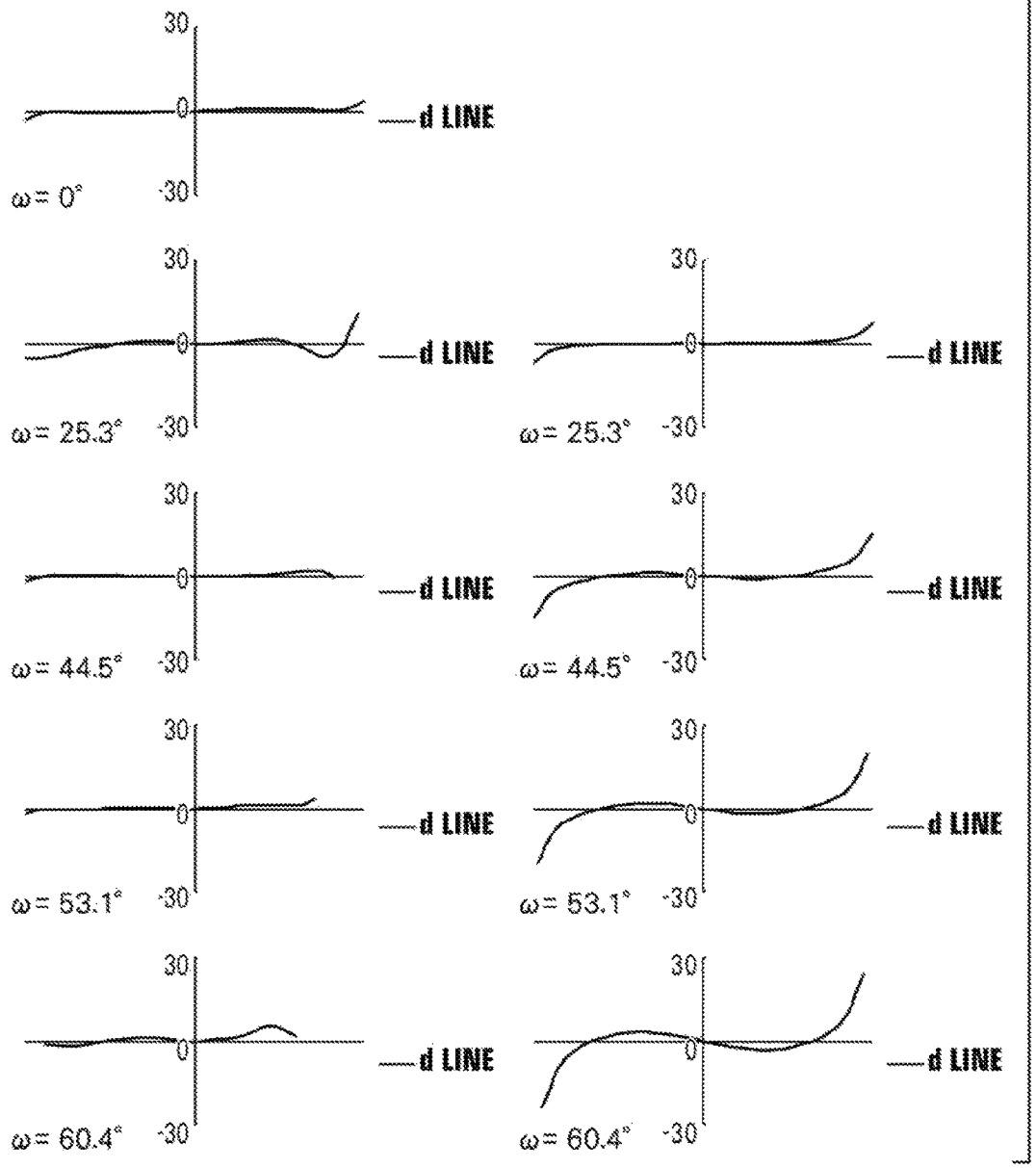
FIG. 13 is a collection of diagrams that illustrate transverse aberrations of the imaging lens of Example 3.

Next, an imaging lens of Example 3 will be described. FIG. 3 is a cross sectional diagram that illustrates the lens configuration of the imaging lens of Example 3. Basic lens data are shown in Table 7, data related to various items are shown in Table 8, and data related to aspherical surface coefficients are shown in Table 9 for the imaging lens of Example 3. In addition, FIG. 8 is a collection of diagrams that illustrate various aberrations and FIG. 13 is a collection of diagrams that illustrate transverse aberrations of the imaging lens of Example 3.

TABLE 7

Example 3: Lens Data

| Surface Number | Radius of Curvature | Distance | nd | νd |
|---|---|---|---|---|
| 1 | 19.3769 | 1.2300 | 1.75500 | 52.32 |
| 2 | 3.6839 | 1.5000 | | |
| *3 | −6.1953 | 0.7814 | 1.53409 | 55.87 |
| *4 | 8.9770 | 0.7905 | | |
| 5 | 9.5002 | 4.6222 | 1.71700 | 47.93 |
| 6 | −5.2838 | −0.0600 | | |

TABLE 7-continued

Example 3: Lens Data

| Surface Number | Radius of Curvature | Distance | nd | νd |
|---|---|---|---|---|
| 7 (stop) | ∞ | 1.1525 | | |
| *8 | 4.2077 | 1.0286 | 1.63360 | 23.61 |
| *9 | 1.8157 | 3.2657 | 1.53409 | 55.87 |
| *10 | −5.4101 | 0.2980 | | |
| *11 | −7.8482 | 0.7346 | 1.63360 | 23.61 |
| *12 | 66.1887 | 3.0550 | | |

TABLE 8

Example 3: Items (d line)

| | |
|---|---|
| f | 3.12 |
| Bf | 3.06 |
| F No. | 2.28 |
| 2ω [°] | 120.8 |

TABLE 9

Example 3: Aspherical Surface Coefficients

| | Surface Number | | | | | | |
|---|---|---|---|---|---|---|---|
| | 3 | 4 | 8 | 9 | 10 | 11 | 12 |
| KA | −9.7438820E+00 | 3.0847360E+00 | −1.3565018E+00 | −1.0048200E+00 | −5.5065889E−01 | −9.3759420E+00 | −9.9398450E+00 |
| A3 | −8.0671836E−16 | −1.5079618E−14 | −1.3934049E−17 | −7.4643415E−16 | −9.3669237E−16 | −9.7333568E−18 | 4.7096188E−18 |
| A4 | 5.1933969E−02 | 7.4930289E−02 | 1.7162523E−03 | 3.3607737E−02 | −1.1345694E−01 | −1.1130787E−01 | −3.7115715E−02 |
| A5 | −1.1111083E−01 | −1.6824931E−01 | −4.0013800E−03 | −7.1777723E−02 | 2.5584561E−01 | 5.9809326E−03 | −3.9145633E−02 |
| A6 | 1.1955087E−01 | 2.3403624E−01 | 1.4823034E−02 | 5.3595992E−02 | −4.0496531E−01 | 5.8829681E−02 | 3.8035044E−02 |
| A7 | −6.7027402E−02 | −1.9721228E−01 | −1.8330556E−02 | 4.4265200E−02 | 4.2675007E−01 | 4.3873658E−03 | 2.9009433E−02 |
| A8 | 1.7091635E−02 | 1.1086153E−01 | 1.0004785E−02 | −8.8258751E−02 | −2.3635339E−01 | −3.0455344E−02 | −2.8827989E−02 |
| A9 | 7.7776487E−04 | −3.8031010E−02 | −4.8643886E−04 | 4.2372209E−02 | 2.3143774E−02 | −2.0853571E−03 | −8.8366788E−03 |
| A10 | −1.6648099E−03 | 1.7633615E−03 | −1.9666259E−03 | 4.4953506E−03 | 4.4153658E−02 | 1.1855433E−02 | 1.2079264E−02 |
| A11 | 3.6271656E−04 | 5.1398368E−03 | 7.1785632E−04 | −1.1264224E−02 | −2.0320875E−02 | 3.9943428E−04 | 1.3461070E−03 |
| A12 | 6.7419810E−06 | −2.0146362E−03 | 6.0457342E−05 | 3.7681175E−03 | 3.2343818E−04 | −2.9786227E−03 | −2.9992070E−03 |
| A13 | −1.5189020E−05 | 6.2403131E−05 | −8.7874901E−05 | 1.9870063E−04 | 1.8242349E−03 | −1.7720150E−05 | −8.3398530E−05 |
| A14 | 2.1444869E−06 | 1.2099727E−04 | 1.3048504E−05 | −5.8259224E−04 | −4.1927662E−04 | 4.7175534E−04 | 4.6643294E−04 |
| A15 | 8.4657216E−08 | −2.2960751E−05 | 3.5652093E−06 | 1.4917868E−04 | −7.7206122E−06 | −5.5127560E−06 | −2.7423962E−06 |
| A16 | −5.3054632E−08 | −3.4349351E−07 | −1.2224705E−06 | 2.1644559E−05 | 2.0278792E−05 | −4.5870022E−05 | −4.5000753E−05 |
| A17 | 4.2160982E−09 | 4.0964844E−07 | 2.7603442E−09 | −1.4183386E−05 | −4.4277200E−06 | 8.3380668E−07 | 6.2951627E−07 |

TABLE 9-continued

Example 3: Aspherical Surface Coefficients

| | Surface Number | | | | | | |
|---|---|---|---|---|---|---|---|
| | 3 | 4 | 8 | 9 | 10 | 11 | 12 |
| A18 | 2.4593307E−10 | −5.8958731E−08 | 3.3940290E−08 | 7.6025496E−07 | 1.0775476E−07 | 2.5013295E−06 | 2.4614776E−06 |
| A19 | −5.2794542E−11 | 1.1613940E−08 | −2.2281820E−09 | 3.8902497E−07 | 1.2271354E−07 | −3.4580389E−08 | −2.3468810E−08 |
| A20 | 2.1475929E−12 | −1.0886703E−09 | −1.8033436E−10 | −4.7774775E−08 | −1.4898332E−08 | −5.8425101E−08 | −5.8060306E−08 |

Figure 9:
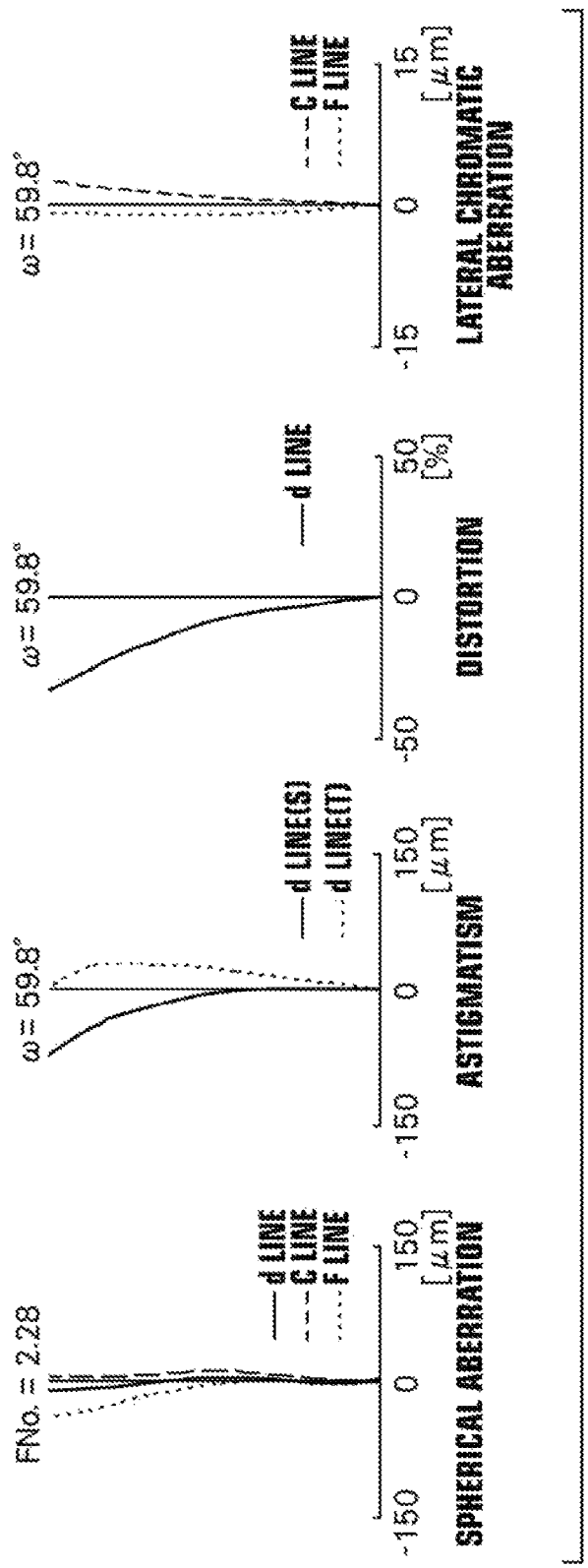
FIG. 9 is a collection of diagrams that illustrate various aberrations of the imaging lens of Example 4.
Figure 14:
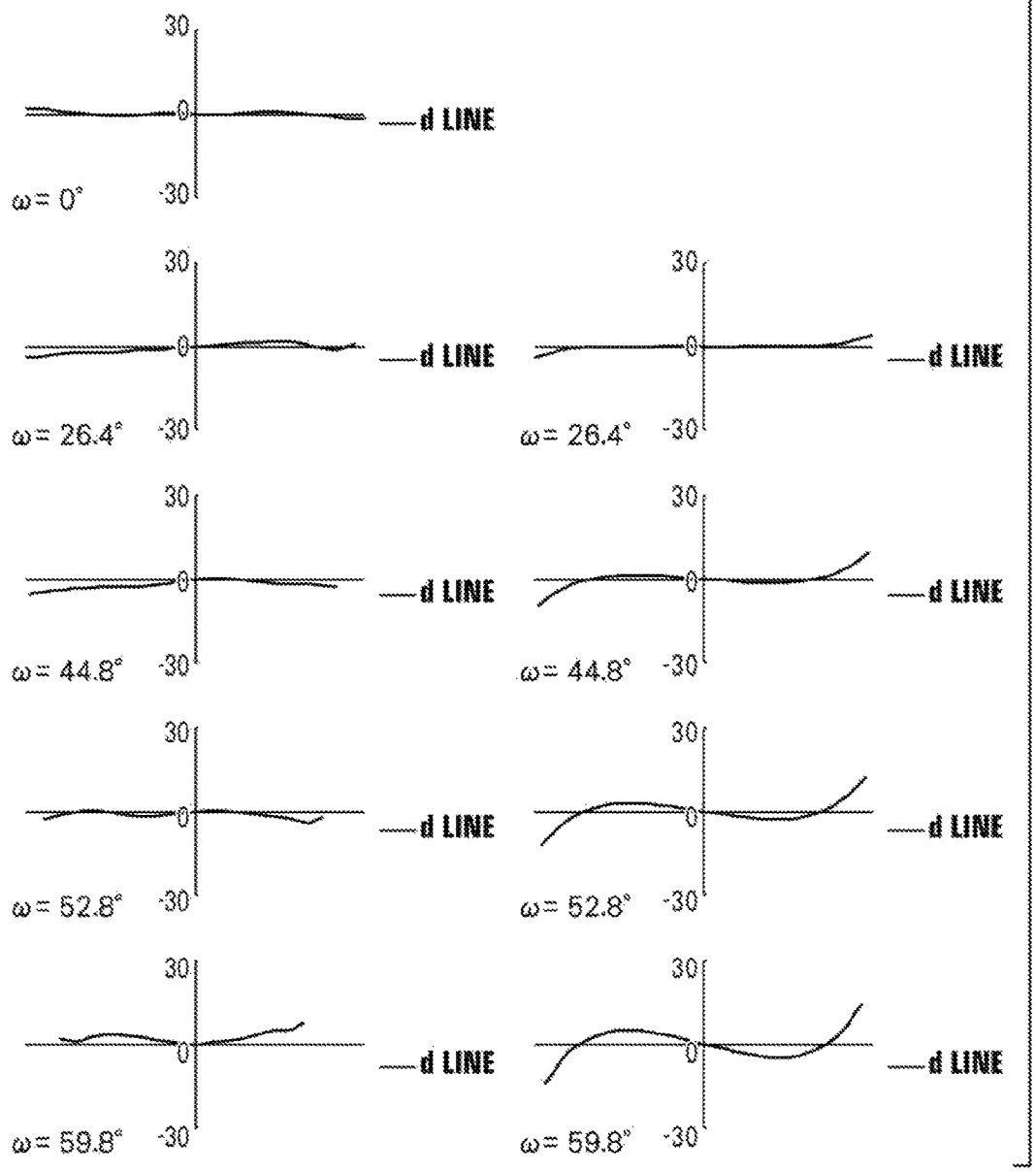
FIG. 14 is a collection of diagrams that illustrate transverse aberrations of the imaging lens of Example 4.

Next, an imaging lens of Example 4 will be described. FIG. 4 is a cross sectional diagram that illustrates the lens configuration of the imaging lens of Example 4. Basic lens data are shown in Table 10, data related to various items are shown in Table 11, and data related to aspherical surface coefficients are shown in Table 12 for the imaging lens of Example 4. In addition, FIG. 9 is a collection of diagrams that illustrate various aberrations and FIG. 14 is a collection of diagrams that illustrate transverse aberrations of the imaging lens of Example 4.

TABLE 11

| Example 4: Items (d line) | |
|---|---|
| f | 2.93 |
| Bf | 3.20 |
| F No. | 2.28 |
| 2ω [°] | 119.6 |

TABLE 12

Example 4: Aspherical Surface Coefficients

| | Surface Number | | | | | | |
|---|---|---|---|---|---|---|---|
| | 3 | 4 | 8 | 9 | 10 | 11 | 12 |
| KA | −9.3851590E+00 | −6.1543620E+00 | −1.1696276E+00 | −8.8931829E−01 | −2.3304536E+00 | 8.0518613E+00 | −3.5334187E+00 |
| A3 | 7.8858892E−16 | −6.2455731E−16 | 1.3528746E−16 | 4.3988682E−16 | −2.4490072E−15 | 6.9657129E−18 | 3.6986658E−18 |
| A4 | 4.6582837E−02 | 6.5975069E−02 | 4.9322119E−03 | 3.0023608E−02 | −8.2132398E−02 | −8.7125092E−02 | −3.7998609E−02 |
| A5 | −6.6942031E−02 | −1.1741462E−01 | −1.5408806E−02 | −6.3238478E−02 | 2.2614111E−01 | 2.2413396E−02 | −2.3416409E−02 |
| A6 | 6.5090930E−02 | 1.7000707E−01 | 3.0849152E−02 | 4.3725721E−02 | −4.2189649E−01 | 4.8714369E−03 | 2.5952810E−02 |
| A7 | −3.5726860E−02 | −1.4874607E−01 | −3.2426520E−02 | 3.6388221E−02 | 4.4161138E−01 | −7.0908031E−03 | 1.5650304E−02 |
| A8 | 8.8516430E−03 | 8.0560749E−02 | 1.7838095E−02 | −7.5111589E−02 | −2.2696979E−01 | 1.3522069E−02 | −1.6251510E−02 |
| A9 | 3.5350055E−04 | −2.4347205E−02 | −1.9203904E−03 | 4.1698063E−02 | 1.8374232E−02 | 2.4152410E−03 | −3.1734590E−03 |
| A10 | −7.2043080E−04 | 3.3113842E−04 | −3.8010060E−03 | 3.0557076E−04 | 4.0880215E−02 | −7.3833708E−03 | 6.4074325E−03 |
| A11 | 1.3249326E−04 | 3.0107378E−03 | 2.1715905E−03 | −1.0726727E−02 | −1.9411449E−02 | −6.9665197E−04 | −6.0389388E−05 |
| A12 | 4.8904785E−06 | −1.0622125E−03 | −7.9232758E−05 | 4.4105575E−03 | 9.9994399E−04 | 2.0423413E−03 | −1.5364047E−03 |
| A13 | −4.6262032E−06 | 4.2758069E−05 | −3.1512930E−04 | 1.9308388E−04 | 1.7213288E−03 | 1.4180151E−04 | 1.2672463E−04 |
| A14 | 5.1633350E−07 | 5.5393160E−05 | 8.2768423E−05 | −6.5470688E−04 | −5.0296607E−04 | −3.3890924E−04 | 2.3467005E−04 |
| A15 | 2.1415602E−08 | −1.1998272E−05 | 1.5359386E−05 | 1.3636242E−04 | −9.3864337E−05 | −1.8222588E−05 | −2.1298781E−05 |
| A16 | −1.0825903E−08 | 2.5789013E−07 | −7.9965579E−06 | 2.8673344E−05 | 2.6367742E−05 | 3.3785987E−05 | −2.2630441E−05 |
| A17 | 8.9313763E−10 | 1.9896537E−07 | 2.0570356E−08 | −1.2829391E−05 | −4.6694481E−06 | 1.2842430E−06 | 1.5202135E−06 |
| A18 | 3.2600821E−11 | −3.7366728E−08 | 2.7867952E−07 | 3.1761564E−07 | −1.3207337E−07 | −1.8659604E−06 | 1.2534699E−06 |
| A19 | −9.3112078E−12 | 4.7991711E−09 | −1.4337811E−08 | 3.4772394E−07 | 1.2634566E−07 | −3.7369794E−08 | −4.1319212E−08 |
| A20 | 4.0934404E−13 | −3.1188369E−10 | −2.5849975E−09 | −3.6247201E−08 | −1.0961453E−08 | 4.3896599E−08 | −3.0105498E−08 |

Figure 10:
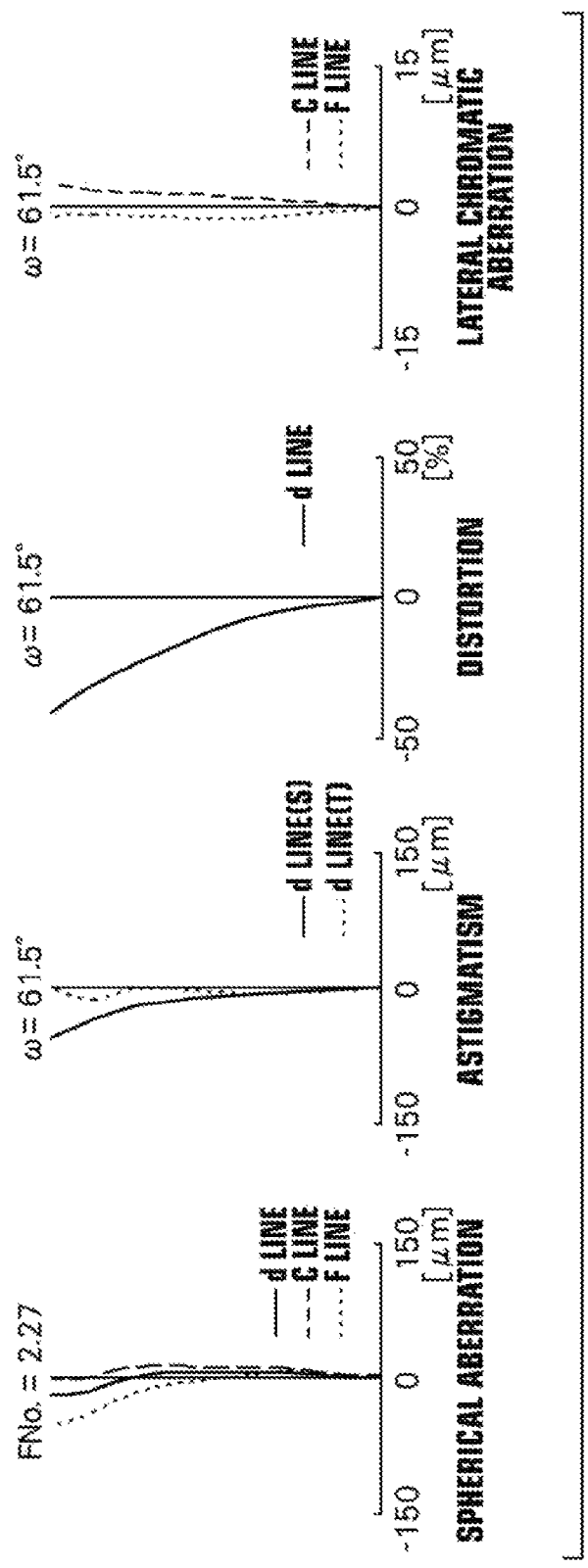
FIG. 10 is a collection of diagrams that illustrate various aberrations of the imaging lens of Example 5.
Figure 15:
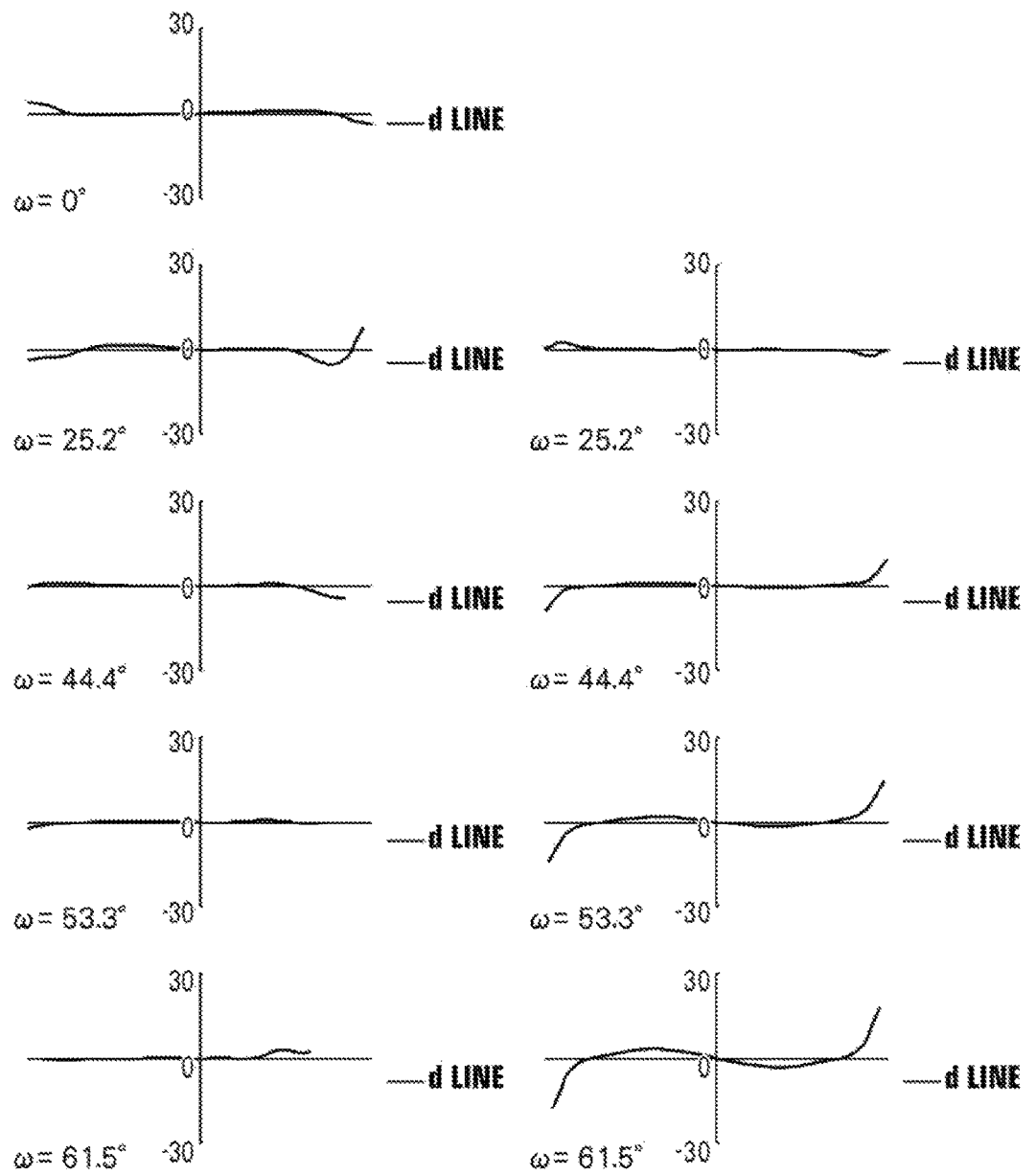
FIG. 15 is a collection of diagrams that illustrate transverse aberrations of the imaging lens of Example 5.

Next, an imaging lens of Example 5 will be described. FIG. 5 is a cross sectional diagram that illustrates the lens configuration of the imaging lens of Example 5. Basic lens data are shown in Table 13, data related to various items are shown in Table 14, and data related to aspherical surface coefficients are shown in Table 15 for the imaging lens of Example 5. In addition, FIG. 10 is a collection of diagrams that illustrate various aberrations and FIG. 15 is a collection of diagrams that illustrate transverse aberrations of the imaging lens of Example 5.

TABLE 10

Example 4: Lens Data

| Surface Number | Radius of Curvature | Distance | nd | vd |
|---|---|---|---|---|
| 1 | 22.2220 | 1.2200 | 1.75500 | 52.32 |
| 2 | 3.6043 | 1.7247 | | |
| *3 | −8.0073 | 0.7100 | 1.53409 | 55.87 |
| *4 | 6.6367 | 1.0739 | | |
| 5 | 8.1301 | 3.9726 | 1.71700 | 47.93 |
| 6 | −5.4405 | 0.4368 | | |
| 7 (stop) | ∞ | 1.3230 | | |
| *8 | 4.4644 | 0.7000 | 1.63360 | 23.61 |
| *9 | 1.9620 | 3.2494 | 1.53409 | 55.87 |
| *10 | −4.9715 | 0.2800 | | |
| *11 | −8.6146 | 0.5590 | 1.63360 | 23.61 |
| *12 | 209.6470 | 3.2017 | | |

TABLE 13

Example 5: Lens Data

| Surface Number | Radius of Curvature | Distance | nd | vd |
|---|---|---|---|---|
| 1 | 21.5725 | 1.6009 | 1.75500 | 52.32 |
| 2 | 3.7517 | 2.0204 | | |
| *3 | −8.5780 | 0.7600 | 1.53409 | 55.87 |
| *4 | 7.2107 | 0.8682 | | |
| 5 | 12.9300 | 4.1751 | 1.71700 | 47.93 |
| 6 | −5.0773 | 0.1712 | | |
| 7 (stop) | ∞ | 1.0024 | | |
| *8 | 4.5078 | 1.1034 | 1.63360 | 23.61 |

TABLE 13-continued

Example 5: Lens Data

| Surface Number | Radius of Curvature | Distance | nd | vd |
|---|---|---|---|---|
| *9 | 1.9478 | 3.1561 | 1.53409 | 55.87 |
| *10 | −5.7939 | 0.3126 | | |
| *11 | −8.3207 | 0.8000 | 1.63360 | 23.61 |
| *12 | 852.8847 | 3.3603 | | |

TABLE 14

Example 5: Items (d line)

| | |
|---|---|
| f | 3.12 |
| Bf | 3.36 |
| F No. | 2.27 |
| 2ω [°] | 123.0 |

TABLE 15

Example 5: Aspherical Surface Coefficients

| | Surface Number | | | | | | |
|---|---|---|---|---|---|---|---|
| | 3 | 4 | 8 | 9 | 10 | 11 | 12 |
| KA | −8.9111457E+00 | −7.5961614E−01 | −1.3199758E+00 | −1.0705994E+00 | 2.4465913E−01 | −7.9263603E+00 | −8.9894756E+00 |
| A3 | −4.8839225E−16 | −3.1856135E−15 | −7.7352523E−17 | −7.2029523E−16 | 3.6829664E−15 | 1.5594074E−18 | −5.4129126E−18 |
| A4 | 3.7462402E−02 | 5.7526654E−02 | 1.4482812E−03 | 3.6232975E−02 | −9.3270349E−02 | −7.4027575E−02 | −1.4688124E−02 |
| A5 | −8.0450814E−02 | −1.4552928E−01 | −3.6637928E−03 | −7.4921733E−02 | 2.4761637E−01 | 7.2899849E−03 | −3.8816004E−02 |
| A6 | 8.4969932E−02 | 2.2243911E−01 | 1.3350504E−02 | 5.1983981E−02 | −4.2588293E−01 | 1.7951186E−02 | 1.9013422E−02 |
| A7 | −4.6184663E−02 | −1.9873186E−01 | −1.6861527E−02 | 4.4130246E−02 | 4.3280722E−01 | 3.3076334E−03 | 3.0791161E−02 |
| A8 | 1.1266782E−02 | 1.1176694E−01 | 9.2618371E−03 | −8.3298211E−02 | −2.2803435E−01 | −8.2058118E−03 | −1.9417264E−02 |
| A9 | 5.2154292E−04 | −3.5535082E−02 | −4.5056496E−04 | 3.7240451E−02 | 2.2318007E−02 | −1.7281133E−03 | −1.0265501E−02 |
| A10 | −9.8892217E−04 | 6.3429990E−04 | −1.7710992E−03 | 5.2191572E−03 | 4.1660828E−02 | 4.8164589E−03 | 9.1604650E−03 |
| A11 | 1.9530605E−04 | 4.7782602E−03 | 6.3319532E−03 | −9.7730428E−03 | −2.0333189E−02 | 3.5577565E−04 | 1.8342233E−03 |
| A12 | 5.1787958E−06 | −1.7685235E−03 | 5.3008194E−05 | 3.0037779E−03 | 8.0785537E−04 | −1.6254370E−03 | −2.3996707E−03 |
| A13 | −7.3360482E−06 | 7.2293092E−05 | −7.5613670E−05 | 1.6212359E−04 | 1.8268800E−03 | −2.6482754E−05 | −1.7136155E−04 |
| A14 | 9.3480675E−07 | 1.0038980E−04 | 1.1285498E−05 | −4.5991237E−04 | −4.7336560E−04 | 3.1196644E−04 | 3.8175009E−04 |
| A15 | 3.5374393E−08 | −2.2365252E−05 | 2.9954486E−06 | 1.2512617E−04 | −6.9122347E−06 | −2.1282906E−06 | 5.8833239E−06 |
| A16 | −2.0873630E−08 | 4.6977704E−07 | −1.0379650E−06 | 1.5412488E−05 | 2.3584283E−05 | −3.4696534E−05 | −3.7065268E−05 |
| A17 | 1.6701934E−09 | 4.0191453E−07 | 2.2268515E−09 | −1.1592856E−05 | −4.5137561E−06 | 4.5680966E−07 | 1.9941758E−07 |
| A18 | 7.9812047E−11 | −7.8805252E−08 | 2.8572214E−08 | 7.1384527E−07 | 5.2720678E−09 | 2.0924296E−06 | 2.0307937E−06 |
| A19 | −1.8611545E−11 | 1.0648555E−08 | −1.7842665E−09 | 3.1036564E−07 | 1.2488219E−07 | −2.0113620E−08 | −1.5130267E−08 |
| A20 | 7.6272389E−13 | −7.1837940E−10 | −1.6046384E−10 | −3.9345207E−08 | −1.3624605E−08 | −5.2996685E−08 | −4.8210685E−08 |

Table 16 shows values corresponding to Conditional Formulae (1) through (9) for the imaging lenses of Examples 1 through 5. Note that all of the Examples use the d line as a reference wavelength, and the values shown in Table 16 below are those for the reference wavelength.

TABLE 16

| Formula | Condition | Example 1 | Example 2 | Example 3 | Example 4 | Example 5 |
|---|---|---|---|---|---|---|
| (1) | r3r/f | −1.6131 | −1.6085 | −1.6914 | −1.8543 | −1.7460 |
| (2) | f12/f | −0.9016 | −0.9494 | −0.9273 | −0.9286 | −0.9312 |
| (3) | f1/f2 | 1.6779 | 0.9593 | 0.9247 | 0.8775 | 0.8673 |
| (4) | f2/f | −1.6528 | −2.2205 | −2.1583 | −2.2774 | −2.3152 |
| (5) | f123/f | 3.1202 | 3.5820 | 4.0755 | 3.8244 | 4.1513 |
| (6) | r3f/f | 2.8635 | 4.1880 | 3.0412 | 2.7711 | 2.6092 |
| (7) | r45/f | 0.6253 | 0.6130 | 0.5812 | 0.6687 | 0.6297 |
| (8) | f6/f | −4.5337 | −4.3525 | −3.5313 | −4.4468 | −4.1724 |
| (9) | max. \| f/fx \| | 0.9721 | 0.9862 | 1.0342 | 0.9321 | 0.9796 |

As can be understood from the above data, all of the imaging lenses of Examples 1 through 5 satisfy Conditional Formulae (1) through (9), and are imaging lenses in which various aberrations are favorably corrected.

Figure 16:
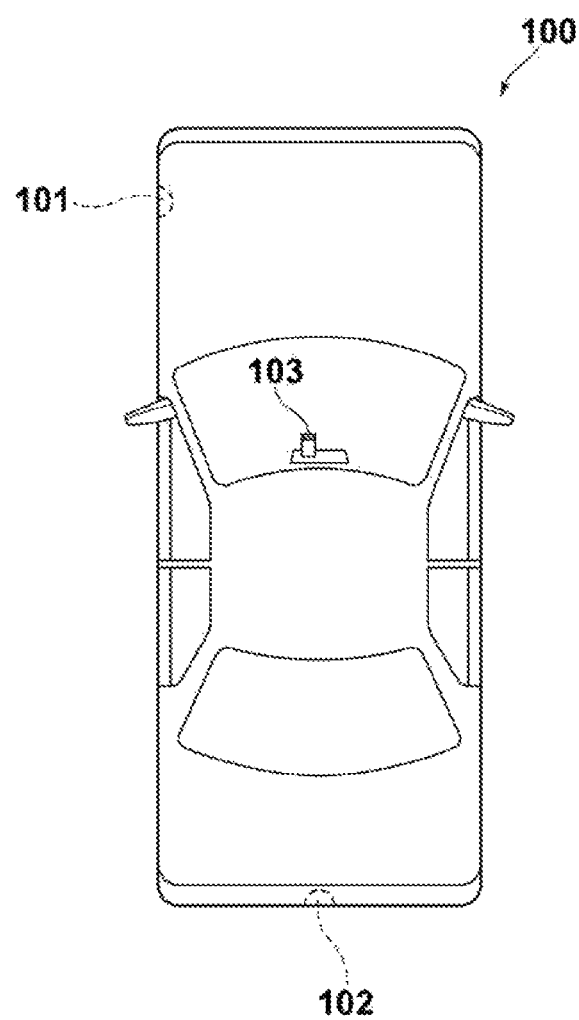
FIG. 16 is a diagram that schematically illustrates an imaging apparatus according to an embodiment of the present disclosure.

Next, an imaging apparatus according to an embodiment of the present disclosure will be described. Here, an example of a case in which a vehicle mounted camera is the embodiment of an imaging apparatus of the present disclosure will be described. FIG. 16 is a diagram that illustrates the manner in which vehicle mounted cameras are mounted on an automobile.

In FIG. 16, an automobile 100 is equipped with an externally mounted camera 101 for imaging a blind spot range at the side surface on the side of the passenger seat, an externally mounted camera 102 for imaging a blind spot range at the rear side of the automobile 100, and a internally mounted camera 103 which is mounted on the back surface of the rear view mirror and images the same range as the field of view of a driver. The externally mounted camera 101, the externally mounted camera 102, and the internally mounted camera 103 are imaging apparatuses according to an embodiment of the present disclosure, and are equipped with imaging lenses according to an embodiment of the present disclosure and imaging elements that convert optical images formed by the imaging lenses into electrical signals. The vehicle mounted cameras of the present embodiment (the externally mounted cameras 101 and 102, as well as the internally mounted camera 103) are equipped with the imaging lens of the present disclosure. Therefore, the vehicle mounted cameras are capable of obtaining favorable images.

The present disclosure has been described with reference to the embodiments and Examples. However, the present disclosure is not limited to the above embodiments and Examples, and various modifications are possible. For example, the numerical values of the radii of curvature, the surface distances, the refractive indices, the Abbe's numbers, etc. of the lens components are not limited to those exemplified in the above Examples, and may be different values.

In addition, the imaging apparatus of the present disclosure is also not limited to a vehicle mounted camera, and may be various other types of imaging apparatuses, such as a camera for a portable terminal, a surveillance camera, and a digital camera.

What is claimed is:

1. An imaging lens consisting of, in order from the object side to the image side:
    a first lens having a negative refractive power and a concave surface toward the image side;
    a second lens having a negative refractive power;
    a third lens having a positive refractive power and a convex surface toward the image side;
    a fourth lens having a negative refractive power and a concave surface toward the image side;
    a biconvex fifth lens which is cemented to the fourth lens; and
    a sixth lens having a negative refractive power and a concave surface toward the object side; and
    Conditional Formula (1) below being satisfied:

$$-2.1 < r3r/f < -1.2 \qquad (1)$$

wherein r3r is the radius of curvature of the surface toward the image side of the third lens, and f is the focal length of the entire lens system.

2. An imaging lens as defined in claim 1, in which Conditional Formula (2) below is satisfied:

$$-1.05 < f12/f < -0.8 \qquad (2)$$

wherein f12 is the combined focal length of the first lens and the second lens, and f is the focal length of the entire lens system.

3. An imaging lens as defined in claim 2, in which Conditional Formula (2-1) below is satisfied:

$$-1.0 < f12/f < -0.85 \qquad (2\text{-}1).$$

4. An imaging lens as defined in claim 1, in which Conditional Formula (3) below is satisfied:

$$0.7 < f1/f2 < 2.0 \qquad (3)$$

wherein f1 is the focal length of the first lens, and f2 is the focal length of the second lens.

5. An imaging lens as defined in claim 4, in which Conditional Formula (3-1) below is satisfied:

$$0.8 < f1/f2 < 1.2 \qquad (3\text{-}1).$$

6. An imaging lens as defined in claim 1, wherein:
    the second lens is of a biconcave shape.

7. An imaging lens as defined in claim 1, in which Conditional Formula (4) below is satisfied:

$$-2.8 < f2/f < -1.3 \qquad (4)$$

wherein f2 is the focal length of the second lens, and f is the focal length of the entire lens system.

8. An imaging lens as defined in claim 7, in which Conditional Formula (4-1) below is satisfied:

$$-2.5 < f2/f < -1.5 \qquad (4\text{-}1).$$

9. An imaging lens as defined in claim 1, in which Conditional Formula (5) below is satisfied:

$$2.5 < f123/f < 5.0 \qquad (5)$$

wherein f123 is the combined focal length of the first lens, the second lens, and the third lens, and f is the focal length of the entire lens system.

10. An imaging lens as defined in claim 9, in which Conditional Formula (5-1) below is satisfied:

$$3.0 < f123/f < 4.5 \qquad (5\text{-}1).$$

11. An imaging lens as defined in claim 1, in which Conditional Formula (6) below is satisfied:

$$2.0 < r3f/f < 6.0 \qquad (6)$$

wherein r3f is the radius of curvature of the surface toward the object side of the third lens, and f is the focal length of the entire lens system.

12. An imaging lens as defined in claim 11, in which Conditional Formula (6-1) below is satisfied:

$$2.5 < r3f/f < 5.0 \qquad (6\text{-}1).$$

13. An imaging lens as defined in claim 1, in which Conditional Formula (7) below is satisfied:

$$0.5 < r45/f < 0.75 \qquad (7)$$

wherein r45 is the radius of surface of the coupling surface between the fourth lens and the fifth lens, and f is the focal length of the entire lens system.

14. An imaging lens as defined in claim 13, in which Conditional Formula (7-1) below is satisfied:

$$0.55 < r45/f < 0.7 \qquad (7\text{-}1).$$

15. An imaging lens as defined in claim 1, in which Conditional Formula (8) below is satisfied:

$$-5.5 < f6/f < -2.5 \qquad (8)$$

wherein f6 is the focal length of the sixth lens, and f is the focal length of the entire lens system.

16. An imaging lens as defined in claim 15, in which Conditional Formula (8-1) below is satisfied:

$$-5.0 < f6/f < -3.0 \qquad (8\text{-}1).$$

17. An imaging lens as defined in claim 1, in which Conditional Formula (9) below is satisfied:

$$0.85 < \max.|f/fx| < 1.2 \qquad (9)$$

wherein f is the focal length of the entire lens system, a is the focal length of an xth lens, and x is an integer within a range from 1 to 6.

18. An imaging lens as defined in claim 17, in which Conditional Formula (9-1) below is satisfied:

$$0.9 < \max.|f/fx| < 1.1 \qquad (9\text{-}1).$$

19. An imaging lens as defined in claim 1, in which Conditional Formula (1-1) below is satisfied:

$$-2.0 < r3r/f < -1.45 \qquad (1\text{-}1).$$

20. An imaging apparatus equipped with an imaging lens as defined in claim 1.

* * * * *